(12) United States Patent
Bramwell et al.

(10) Patent No.: US 8,880,038 B2
(45) Date of Patent: Nov. 4, 2014

(54) COMMUNICATIONS DEVICE, COMMUNICATIONS SERVICE AND METHODS FOR PROVIDING AND OPERATING THE SAME

(75) Inventors: Nigel Bramwell, London (GB); Vinod Sankar, London (GB)

(73) Assignee: Voiamo Limited, London (GB)

( * ) Notice: Subject to any disclaimer, the term of this patent is extended or adjusted under 35 U.S.C. 154(b) by 616 days.

(21) Appl. No.: 12/990,423

(22) PCT Filed: May 1, 2009

(86) PCT No.: PCT/GB2009/050459
§ 371 (c)(1),
(2), (4) Date: May 16, 2011

(87) PCT Pub. No.: WO2009/133410
PCT Pub. Date: Nov. 5, 2009

(65) Prior Publication Data
US 2011/0294472 A1 Dec. 1, 2011

(30) Foreign Application Priority Data
May 1, 2008 (GB) .................................. 0807976.6

(51) Int. Cl.
*H04M 11/10* (2006.01)
*H04W 8/18* (2009.01)
*H04W 8/06* (2009.01)
*H04W 8/04* (2009.01)

(52) U.S. Cl.
CPC . *H04W 8/18* (2013.01); *H04W 8/06* (2013.01); *H04W 8/04* (2013.01)

USPC ........ 455/413; 455/432.2; 455/445; 455/466; 370/401

(58) Field of Classification Search
USPC ................................ 455/413, 432.3, 445, 466
See application file for complete search history.

(56) References Cited

U.S. PATENT DOCUMENTS

| | | | |
|---|---|---|---|
| 8,059,663 B1* | 11/2011 | Mangal et al. | 370/401 |
| 2002/0022453 A1 | 2/2002 | Balog | |
| 2003/0157938 A1 | 8/2003 | Haas | |
| 2004/0243941 A1* | 12/2004 | Fish | 715/752 |
| 2005/0201362 A1 | 9/2005 | Klein | |
| 2006/0148495 A1* | 7/2006 | Wilson | 455/466 |
| 2006/0172772 A1 | 8/2006 | Bjorkner | |
| 2013/0269037 A1* | 10/2013 | Casimere et al. | 726/26 |

FOREIGN PATENT DOCUMENTS

| | | |
|---|---|---|
| EP | 1 130 869 | 9/2001 |
| EP | 1507420 | 2/2005 |
| WO | WO 02/45344 | 6/2002 |
| WO | 2006094564 A1 | 9/2006 |

OTHER PUBLICATIONS

AnonYmous: "Mobile phone using user-defined, location-dependent profiles" Research Disclosure, Mason Publications, Hampshire, GB. vol. 438, No. 21; Oct. 1, 2000.

* cited by examiner

*Primary Examiner* — David Q Nguyen
(74) *Attorney, Agent, or Firm* — Baker and Hostetler LLP

(57) ABSTRACT

A communications device for use on a communications network comprising: at least two communications profiles, each communications profile being associated with a geographic region within which the communications device is to be used processing means arranged to allow an active communications profile to be selected from the at least two communications profiles.

14 Claims, 17 Drawing Sheets

Outbound call handling

USER List

| Field name | Type | Length |
|---|---|---|
| Name | String | Xxxxxx |
| Array of MSISDN Profiles | Compound structure | - |
| Is-Enabled | Boolean | 1 |
| Active MSISDN | String | Xxxxxx |
| Email-Id | String | Xxxxxx |

MSISDN NumberPool

| Field name | Type | Length |
|---|---|---|
| MSISDN_number | String | Xxxxxx |
| Access Gateway index | Integer | 4 |

*Fig. 16*

Gateway_NumberPool

| Field name | Type | Length |
|---|---|---|
| Gateway_number | String | Xxxxxx |
| Is_inuse | Boolean | 1 |

*Fig. 17*

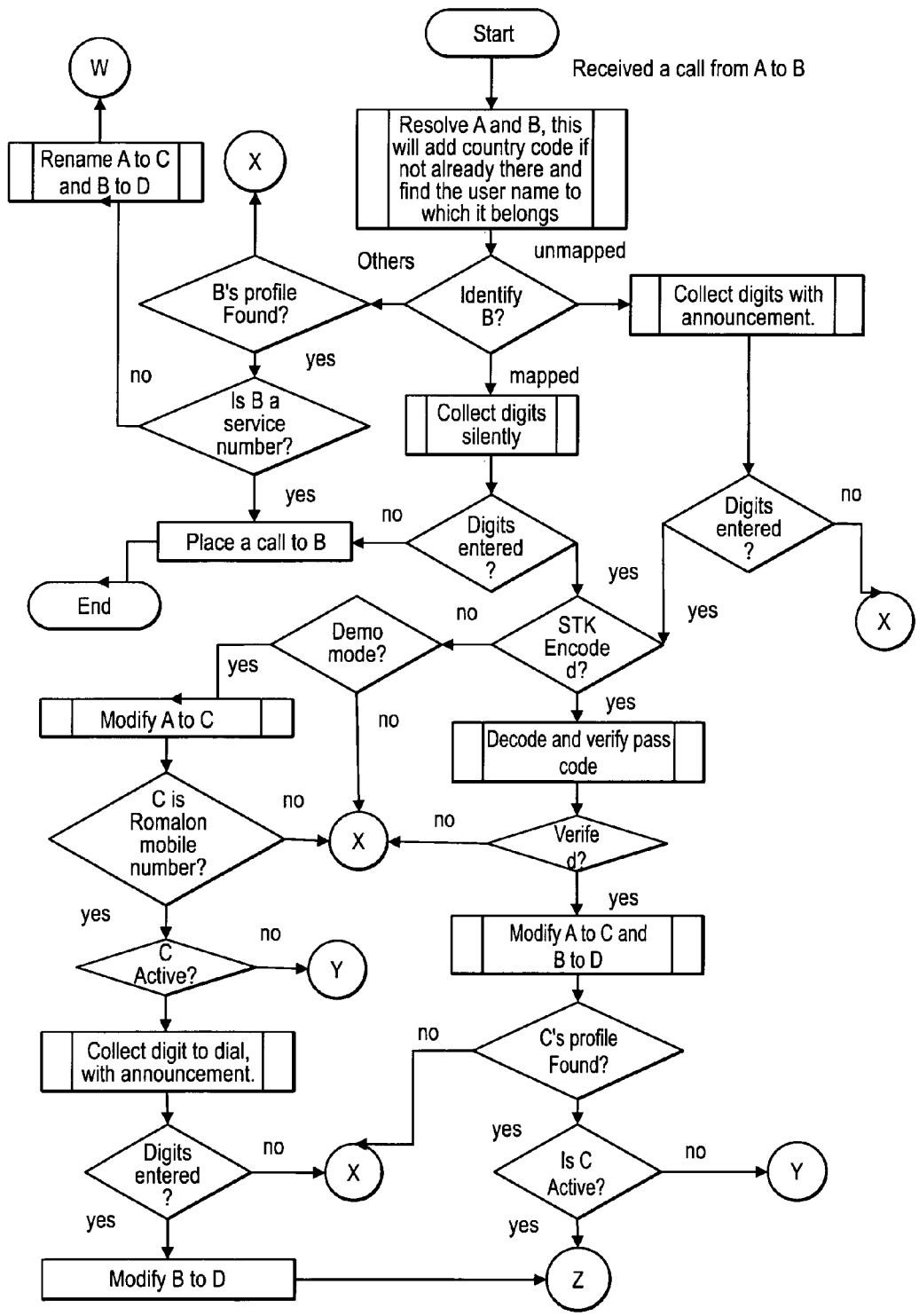
*Fig. 18* Identifying caller.

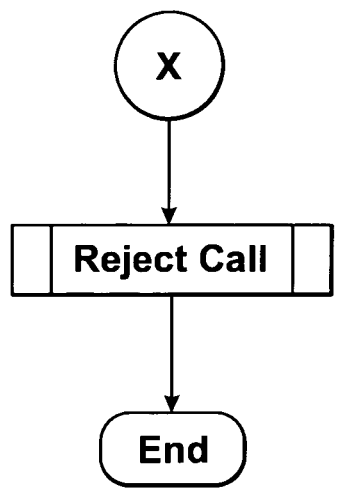
*Fig. 19*   Call Reject Procedure
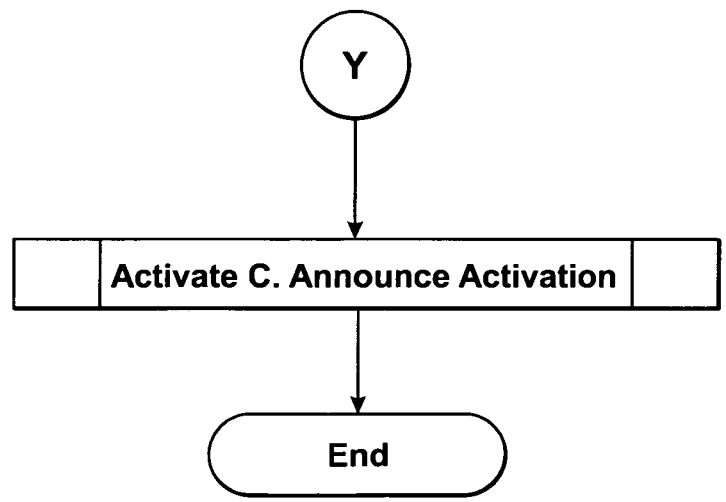
*Fig. 20*   User Activation

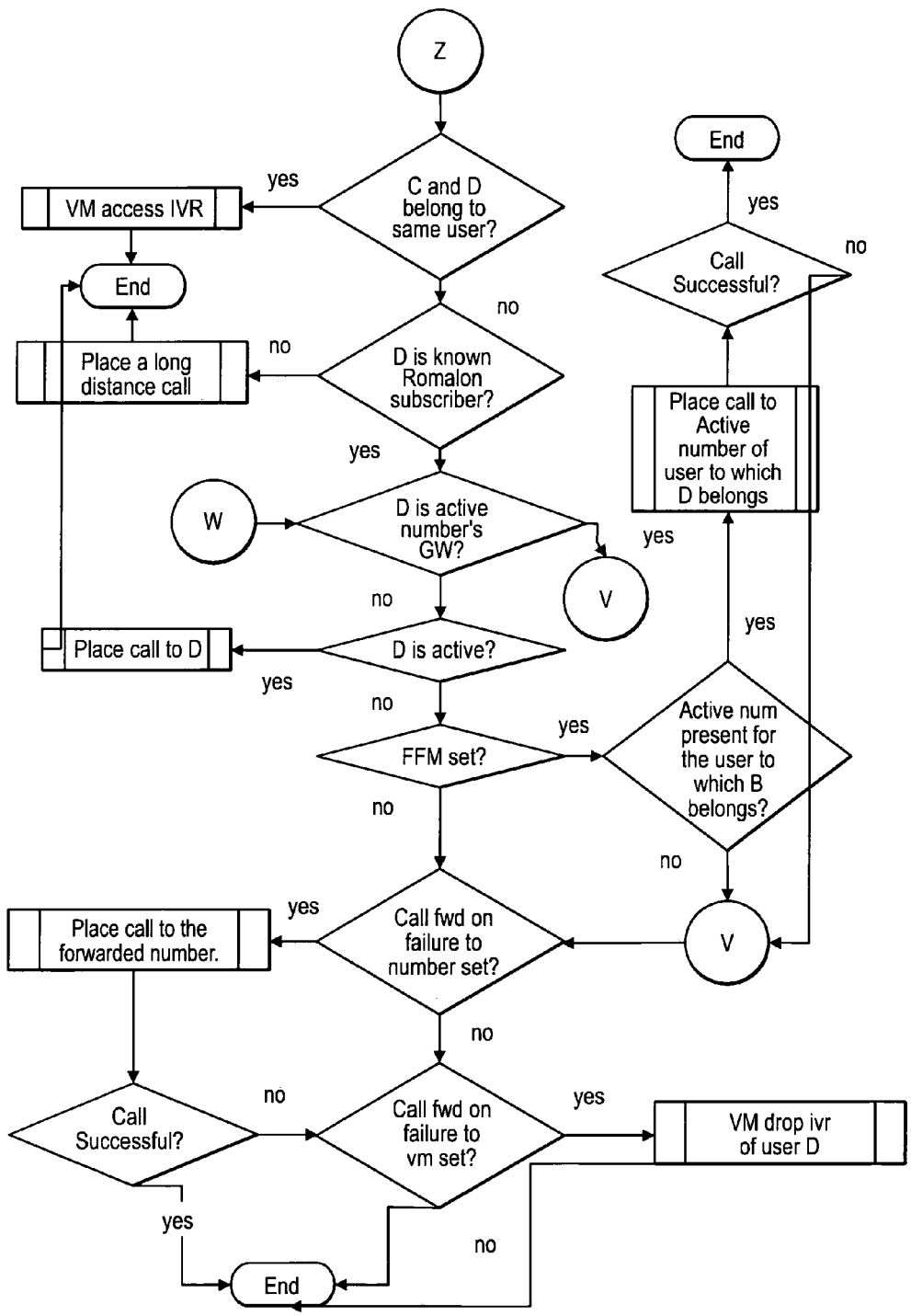
Fig. 21 Final step of call completion

COMMUNICATIONS DEVICE, COMMUNICATIONS SERVICE AND METHODS FOR PROVIDING AND OPERATING THE SAME

TECHNICAL FIELD

The present invention relates to a communications device, communications service and methods for providing or operating the same. In particular, the present invention relates to a mobile communications device and a communications server and associated methods of operating such devices in a manner as to avoid the requirement for traditional call roaming.

BACKGROUND TO THE INVENTION

FIG. 1 illustrates a typical scenario that may be encountered when a user visits another country and uses their mobile phone (which is registered in their home country) to make telephone calls (including calls to a voicemail account) or to send messages (such as short messaging service [SMS] or multimedia messaging service [MMS]).

There are three networks (2, 4, 6) shown in FIG. 1 each of which comprises a gateway mobile switching centre (8, 10, 12) (GMSC) and a home location register (14, 16, 18) (HLR). It is noted that the Home Location Register (HLR) is the main database of permanent subscriber information for a mobile network which is maintained by a subscriber's home carrier (or the network operator where the user initiated the call). The HLR contains pertinent user information, including address, account status, and preferences and, in use, interacts with the GMSC, which is a switch used for call control and processing. The GMSC also serves as a point-of-access to the Public Switched Telephone Network (PSTN—the fixed network).

In FIG. 1 user A is connected to a network 2 other than his home operator's network 4. User B is connected to a third network 6 (which may be a network operator in the same country as user A's home operator).

In order to make or receive a call between user A and user B it is necessary for the call to make two separate international transits. Such an arrangement has a number of drawbacks as detailed below.

Firstly, when user A moves to a new country, he is forced to incur international roaming rates which are significantly higher than regular service charges incurred when the user is not roaming. It is noted that simply forwarding calls received at user A's home mobile number to an international phone number (e.g. a mobile phone registered in the country within which user A is roaming) is generally not possible since network operators have barred services like forwarding to an international number.

Secondly, callers in user A's visited country have to call his home country's number and thus get charged for international calls.

Thirdly, even basic services like receiving an incoming call or accessing a voicemail account are charged to user A at significantly higher rates.

In addition to the call charges issues noted above, it is noted that typically a user's mobile phone will lack some of the features provided by the local network provider when the user is roaming.

It is noted that the above issues are not restricted to voice traffic on the network and it is noted that an SMS (text message) cannot be delivered across multiple SIM cards/mobile numbers held by a subscriber, as there is no forwarding option for the same.

It is also noted that there is no regulatory body that governs international roaming charges which means that roaming users are often in receipt of large phone bills following a period of use outside of their home network.

There have been a number of attempts to address the above issues and these are discussed below. It is noted that there are limitations or restrictions to each of these "solutions" meaning that there has been a failure to provide a comprehensive resolution to the issues described above. None of the proposed solutions below has attracted a mass/general adoption.

One mechanism for addressing the above issues is for a user to hold multiple SIM cards, one for each country and set forwarding on all other numbers to the voicemail when he is not reachable. This solution however has a number of disadvantages. Firstly, this solution represents a completely manual task for the user, wherein there is a huge scope for the user unknowingly making mistakes such as not setting the forwarding on one of the numbers to voicemail thus effectively dropping all the calls to that number. In addition the user is required to manually switch between SIM cards whenever the user moves between different countries. Secondly, in the multiple SIM card arrangement, the user is billed by all the individual operators of the SIM cards separately, thus making it difficult to manage the bills. Thirdly, a user who has moved to a new country cannot receive calls from the previous country's number unless the network operator allows the setting up of a call forwarding function to an international number at international calling costs (which is rarely possible). Finally, services like voicemail access are tightly coupled to the local identity of the user. There is no way of receiving voicemail drop intimation when the corresponding number is unreachable or inactive. Also, the user has to manually access the voicemail box of all individual numbers by calling internationally and paying international roaming charges.

An alternative mechanism for addressing the above issues is a callback based solution: where a user calls up a number and submits the number he wishes to call. The system then first makes an incoming call to the user and then places the call to the number the user has submitted. It is noted that this mechanism solves the outgoing call problem. However, the user still has to subscribe for international roaming to receive incoming calls, and those charges are significantly higher than home network call charges. It is also noted that this is an unusual way of making a call and is a complete change in the user experience of the way phone calls are made. Other drawbacks of this service are that it doesn't actually save much in call charges except for some reduction in outgoing calls costs. A significant disadvantage is that this way of making a call suffers from extremely high post-dial delays.

A further alternative mechanism comprises the use of a voice over internet protocol (VoIP) solution where the SIM intercepts the outgoing call and routes the call onto internet using VoIP network. Although call rates of IP are cheaper this solution doesn't drastically reduce the cost as the calls to the VoIP gateway are still charged at international roaming rates. Further this mechanism suffers from the fact that all incoming calls reach the user at international roaming costs.

All the above solutions also suffer from the problem of lack of consolidation of services like voicemail, forwarding function and billing. In one way or the other, all the above-described solutions change the user-feel (user-experience) of the way phone calls are made. Post-dial delays are without doubt also significantly high.

Mobile users roaming in multiple countries, especially, frequent travelers having business across different countries, are amongst the worst hit. Consider the following example for a user who frequently travels between India, U.K and U.S.

The user would have a SIM from India and thus would have to subscribe to that operator's 'International roaming' service to make or receive calls to that number, while out of the home country. The associated costs of usage of the mobile phone when the user is on the move are significantly high, given the fact that every operator on which the user is roaming would impose additional charges per service used (SMS/Call/GPRS) which, if the number had been local, would not have been applicable at all. Moreover, the user is even charged for all incoming calls which otherwise if he uses a local phone is either absolutely free or relatively cheap. These factors inhibit the usage of the mobile phone due to uncertainty in the pricing policy adopted by different operators. Additionally, there is no international body which can regulate an operator's transit charges for calls originated when the user is on 'international roaming'.

It is also noted that prior efforts to address the issues arising when roaming have not addressed the issue of providing an SMS forwarding solution.

The present invention seeks to overcome or at least substantially reduce the above mentioned problems.

STATEMENTS OF INVENTION

According to a first aspect of the present invention there is provided a communications device for use on a communications network comprising: at least two communications profiles, each communications profile being associated with a geographic region within which the communications device is to be used; and, processing means arranged to allow an active communications profile to be selected from the at least two communications profiles.

The present invention is, in its broadest sense, directed to a system which exploits existing GSM networks but simply modifies the way in which the user interacts with them. The interaction requires minimal knowledge or activity by the user and hence has a far lower level of user 'discomfort' than prior art schemes.

Essentially, the user is provided with a communications device that has multiple local SIM identities (i.e. multiple communications profiles). For example the communications device may comprise a special preloaded SIM for a mobile phone, on which are stored the multiple SIM identities. These identities would also be known to a communications server (also referred to herein as the Romalon Server) which may manage communications to and from the communications device.

Each profile is local to a particular geographic region (e.g. to a particular country, state, or geographic area covering multiple countries or parts of countries) where the user may wish to use his mobile phone.

The selection of a particular profile may be fully automatic (i.e. the device chooses the identity without user interaction), partially automatic (the device offers a subset of the available identities to the user for selection, e.g. only the identities local to the current geographic region might be offered. Alternatively, the user may, in the partially automatic variation manually navigate to a menu which details the networks on offer) or fully manual (the user navigates to a menu which shows all available identities regardless of his location and makes the choice of identity himself). In this way, the user is always operating their mobile phone on a local charging tariff without incurring roaming charges. This feature alone allows the user to make calls without incurring roaming charges and to receive local calls without incurring roaming charges.

Conveniently, the user may be sent a prompt from a communications server (e.g. by SMS, USSD [a real-time or instant messaging type phone service] or phone call) to change network or advise that he is not using the best profile.

Preferably the communications device comprises a plurality of communications profiles. This allows local charging tariffs to be used in a plurality of different geographic regions.

Conveniently the device may comprise more than one communications profile per geographic region. This feature would give a user the choice of multiple network operators in a given region. It is noted that any given communications profile need not necessarily restrict a user to a single operator. It is further noted that if the user is in a country that does not match any of his profiles then he would be roaming as normal. In such a case he may conveniently be provided with a choice of profiles to choose from with likely multiple roaming options for each.

In a preferred embodiment the device further comprises output means to output a user selection invitation to select an active communications profile from all the stored communications profiles on the communications device. As noted above, a user may be able to access a selection option that provides access to all the identities stored on the device. This mode of operation corresponds to the fully manual option discussed above. Alternatives to this mode of operation (i.e. fully automatic and semi-automatic selection) are detailed below.

In one variant of the present invention the communications device may further comprise input means for receiving location data related to the location of the communications device. For example, the location data received at the input means may comprise global position system (GPS) data and the device may further comprise a data store detailing the geographical coverage of each communications profile. Alternatively, the location data received at the input means may be derived from an activation or registration process with a communications network on activation or registration of the communications device.

Conveniently, where the communications device receives location data the processing means may reorder the list of communications profiles output to the user as part of the user selection invitation such that the profiles corresponding to the local country are first in the list. Alternatively, the order of the communications profiles may be on the basis of some other benefit to the user, e.g. financial (cheaper rates) or technical (3G services).

In the event there is more than one communications profile for a given location, the processing means may be arranged to select a subset of the at least two communications profiles in dependence on the location data received by the input means and the geographic regions that the at least two communications profiles are associated with. In other words there may be a semi-automatic selection of communications profiles in which the processing means selects all the communications profiles that are relevant to the current location and the user makes the final choice from the selected subset. In this example, the subset of the at least two communications profiles may be output by output means in the form of a user selection invitation.

In a further variant the processing means may be arranged to automatically select an active communications profile in dependence on the location data received by the input means and the geographic regions that the at least two communications profiles are associated with. In other words the selection of communications profile may be fully automatic.

Conveniently the device may further comprise output means arranged to output a communications signal to a home network operator with which the device is associated, the signal comprising details of the active communications profile (i.e. SIM authentication back to the home network).

Preferably, the device further comprises output means arranged to output a communications signal to a communications server that manages communications traffic between the at least two communications profiles associated with the device, the signal comprising details of the active communications profile. The communications server is discussed in more detail below but essentially manages communications traffic between the active and inactive communications profiles associated with the device. For example, where a third party places a call to the mobile number associated with a currently inactive communications profile, the communications server will re-route the call to the currently active profile. The communications signal from the communications device allows the server to maintain details on the current profile so that calls may be routed correctly.

The communications signal outputted by the output means may take a number of different forms, such as: a short messaging service (SMS) message; a communications signal via an IP connection; or, a communications signal over a telecommunications network that the device is connected to.

In one example the communications signal may convey details of the active profile via data in DTMF format.

As a result of the communications device being associated with more than one communications profile it would be possible to place outgoing communications traffic (voice, SMS, MMS, data etc.) via any of the stored profiles. Preferably however the processing means is arranged to place outgoing communications traffic using the active communications profile.

In order to avoid international call charges, the processing means may be arranged to intercept communications directed to a recipient outside of the current geographic region and to redirect then to an access gateway associated with a voice over internet protocol (VoIP) communications network. Conveniently, the access gateway is a VoIP access gateway and has an access number that is local to the geographic region associated with the current communications profile.

Preferably each communications profile comprises an international mobile subscriber identity (IMSI) and also comprises a mobile directory number (MSISDN—Mobile Station International Subscriber Directory). Each communications profile may also be associated with a set of user-defined preferences, e.g. settings for a mobile phone, standing instructions regarding the handling of voicemail messages etc.

Preferably, the communications device may comprise a subscriber identity module, RUIM or USIM. It is noted that the use of SIM cards is mandatory in GSM devices. The equivalent of a SIM in UMTS is called the Universal Integrated Circuit Card (UICC), which runs a USIM application, whereas the Removable User Identity Module (R-UIM) is more popular in CDMA-based devices. The UICC card is still colloquially referred to as a SIM-card and within the context of the following discussion SIM card should be taken to mean a GSM based SIM card, a UICC, RUIM or any other mobile communications based device that provides the basic functionality of a (GSM) SIM.

The present invention extends to a subscriber identity module for a mobile communications device comprising a communications device according to the first aspect of the present invention.

According to a second aspect of the present invention there is provided a communications server for routing communications traffic between a first communications apparatus and a second communications apparatus, the server comprising: input means arranged to receive communications traffic from the first communications apparatus for the second communications apparatus; processing means arranged to determine a routing destination for the communications traffic; output means arranged to route the communications traffic to the routing destination.

The present invention extends to a communications server for use with a multiple identity communications device as described above in relation to the first aspect of the invention.

In the second aspect of the present invention, the system has at its heart, a communications server. Once a new IMSI is activated, the mobile phone (or whatever telecommunications device incorporates the communications device of the first aspect of the present invention) can then inform the communications server of the currently active communications profile. The communications server is always aware of the list of possible profiles for the user and the current identity in use. Home Location Registers are configured to re-route calls directed to any of these known identities of the user to the communications server. Accordingly, calls to an inactive identity of the user are redirected to the communications server where these calls can advantageously be routed through to the currently active local identity. This ensures that a caller can always have the possibility of being connected to the user regardless of which country he is in and which one of his identities is being called. This feature whilst not essential, does in combination provide the additional benefit of reduced roaming charges when the user is being called from abroad and also the major benefit of being able to be contacted even if the caller is calling a not-currently active number of the user. This specific combination is very powerful as no previous solutions have been able to address this technical problem of how to overcome roaming charges whilst at the same time being able to unify all different identities for incoming calls and also to eliminate or minimize roaming charges for both outgoing and incoming calls.

Preferably, the second communications apparatus is associated with an active communications profile and an inactive communications profile, and the input means is arranged to receive communications traffic from the first communications apparatus directed towards the inactive communications profile. Having received communications traffic intended for an inactive communications profile the processing means may be arranged to determine the active communications profile and the output means may be arranged to route the communications traffic to the active communications profile.

Each communications profile may, conveniently, be associated with a geographic region and the processing means may be arranged to determine the location of the second communications apparatus by determining the active communications profile of the communications apparatus.

Each communications profile may have a unique identification number (MSISDN).

In one embodiment each communications profile of the second communications apparatus may be associated with a unique access gateway number. This has the advantage that the communications server may then be able to identify the second communications device from the access gateway number called. Conveniently, the unique access gateway number associated with a given communications profile of the second communications apparatus corresponds to an access gateway that is located within the same geographic region as the given communications profile. In an alternative arrangement there may not be a unique associated between communications profile and access gateway number.

Each communications profile may be associated with a home network operator and the server may be arranged to notify the associated home network operator when the status of a given communications profile changes from active to inactive. This therefore allows the home location register to be updated that communications traffic should be routed to a new number (the HLR may be provided with details of the currently active communications profile number or may be provided with an access gateway number which, as noted above may be unique to the communications device in question).

The processing means may be arranged to identify the second communications apparatus from a unique access gateway number that is called by the first communications apparatus (or forwarded to by the home network operator).

In order for the communications server to be able to keep an up to date record of the active communications profile, the input means may further be arranged to receive a communications signal from the second communications apparatus, the communications signal comprising details of the active communications profile. Conveniently, the communications server may comprise a data store, the data store comprising data relating to each communications profile associated with the second communications apparatus wherein the currently active communications profile of the second communications apparatus is updated upon receipt of the communications signal.

In an alternative scenario, the processing means may be arranged to determine the routing destination of the second communications apparatus from the number dialed by the first communications apparatus. In such a case, the input means may be arranged to receive a communications signal from the first communications apparatus, the signal comprising data in DTMF format, and the processing means may be arranged to analyse the DTMF data to determine the location of the second communications device.

In a further alternative scenario, the routing destination may be a voicemail account and the output means may be arranged to route the communications traffic to the voicemail account. It is also noted that the communications server may be configured to route incoming communications traffic to a voicemail account as a default action when a call connection cannot be made (e.g. communications device is off, out of range of a signal or when the user has selected a "do not disturb" mode). The second communications apparatus may be associated with a plurality of communications profiles and the input means may be arranged to receive communications traffic directed towards any of the plurality of communications profiles. In such cases the processing means may be arranged to determine if any of the plurality of communications profiles are active and, in the event that no profile is active, to determine the routing destination to be a voicemail account common to the plurality of communications profiles.

Conveniently, the first communications device may be located in a first geographic region and the second communications device may be located in a second geographic region. Local access gateways may be located in each geographic region.

The communications traffic may comprise one or more of the following types: voice calls, SMS communications, MMS communications, data traffic.

According to a third aspect the present invention provides a communications system comprising: a communications server according to the second aspect of the present invention and at least two access gateways wherein each gateway is arranged to be in communication with the communications server.

Preferably each access gateway may be located within a different geographic region. Further, each access gateway may be arranged to be in communication with one or more telecommunications networks located within the same geographic region as the access gateway.

Conveniently, the communications system may further comprise a communications device as claimed in the first aspect of the present invention. Conveniently, each communications profile for a given geographic region may be associated with a unique access gateway number for the access gateway located within that given geographic region. Further, the system may be arranged to output a notification signal to telecommunications network operators of inactive communications profiles to forward communications traffic directed towards the inactive communications profile to the associated unique access gateway number. As noted above, in some arrangements there may not be a unique association between access gateway and communications profile.

According to a third aspect of the present invention there is provided a method of operating a communications device for use on a communications network comprising the steps of: providing at least two communications profiles, each communications profile being associated with a geographic region within which the communications device is to be used; selecting an active communications profile from the at least two communications profiles.

It is noted that preferred features of the first and second aspects of the invention apply to the third aspect of the invention.

According to a fourth aspect of the present invention there is provided a method of operating a communications server for routing communications traffic between a first communications apparatus and a second communications apparatus, the method comprising: receiving communications traffic from the first communications apparatus for the second communications apparatus; determining a routing destination for the communications traffic; routing the communications traffic to the routing destination.

It is noted that preferred features of the first and second aspects of the invention apply to the fourth aspect of the invention.

The invention extends to a carrier medium for carrying a computer readable code for controlling a communications device to carry out the method of the third aspect of the invention and a carrier medium for carrying a computer readable code for controlling a communications server to carry out the method of the fourth aspect of the invention.

Further attributes and advantages of embodiments of the present invention are set out below:
  a. A local identity (communications profile) may be given to the user in every country (geographic region) he travels to, by providing a local number in each of the subscribed countries.
  b. Switching to the local number may be either a manual or automated task done by the SIM in the mobile telecommunications device itself.
  c. The user can be reached on his currently active number when called on ANY of his subscribed numbers. Thus, callers can call the user on a local number irrespective of the user's current location. This also means that the callers won't have to bear the cost of international calls to call the user.
  d. A common voicemail is provided across all the user's numbers, thus making it easier to manage any missed calls on any of the user's numbers.
  e. Forwarding works across all the subscribed countries and a unified view of forwarding settings can be provided via a web portal.

f. Consolidated bills can be achieved across all the user's numbers thus making it easier for the user to manage his or her phone bills.

g. Unique advanced features like selecting caller-ID from the list of subscribed numbers belonging to different countries is also made possible. Furthermore, it is also possible to make private calls without revealing the identity of the user.

h. Using a SIM application (processing means of the communications device of the first aspect of the present invention) makes it possible to be independent of a particular mobile telecommunications handset and also if the user desires to change the handset at a later point of time, he can do so. In this case, the SIM application notifies a communications server of any change in the handset by detecting a change in the IMEI number of the user's mobile equipment. The SIM application pushes the device's IMEI number to the communications server as a part of registration process. Thus this enables the communications server's device manager to push the configuration to the new handset, thus changing mobile equipment advantageously does not result in service discontinuity.

i. Complete access to a local operator's features is possible since the mobile telecommunications device takes up a local identity wherever it goes.

j. There is advantageously no change at all in the way a user handles the call whether incoming or outgoing.

k. The service dramatically reduces costs for both the callers and the recipients of roaming phone calls, by using local, in-country numbers, effectively making all international calls as local calls. This means that:
  1. No subscription to international roaming is required.
  2. All the calls are charged at the rates much lower than the international roaming call rates.
  3. Incoming calls are received free of cost or at a relatively lower cost than in the prior art.

The steps which are typically followed on service subscription are set out below:

1. A user subscribes to the countries which he normally roams in. This list can be updated even at a future time post service subscription. Thus the user now has a mobile number in all of the countries he subscribes to.
2. The subscriber gets a multi-IMSI SIM card which has pre-allocated IMSIs for all the countries where the services according to the present invention are delivered. The SIM also has provision for adding new IMSIs by having placeholders for the same. Even though all the IMSIs are already pre-allocated only the IMSIs corresponding to the countries to which user has subscribed are enabled. (This optional pre-provisioning is done preferably to avoid OTA (over the air) updates of critical information such as IMSI number and the associated authentication keys. However, the present invention also extends to the less advantageous provision of these multiple identities on the Multi-IMSI SIM card via OTA updates if required). This pre-allocated feature enables the user to subscribe to the new countries on-the-fly without any service discontinuity.
3. The SIM has a local software application which checks the user's current location and can activate the IMSI which is local to the current location either on user selection or automatically. This SIM application, then informs the Romalon Server of the user's active number, where all his calls can be diverted to. Thus, the backend Romalon Server learns about the user's currently active number and location. The steps can be outlined as follows:
   a. The user moves to a different country which is part of a list of the countries to which he has subscribed under the present invention's service (also called the Romalon Service).
   b. The SIM, during the GSM registration process, determines the country code of the country and compares it with the last-used country-code stored in one of its files in the SIM.
   c. On detecting a country change, the SIM checks if it has a local number/IMSI corresponding to the new location and makes that number the user's active number. The SIM then informs the communications server of the user's new location. There are multiple different ways in which this information can be sent and all these ways are tried in a fallback manner to ensure that the Romalon Server is informed of the user's current location. The following different communications mechanisms can be tried to inform Romalon Server:
      i. Placing a call to one of a plurality of telecommunication gateways (Romalon gateways) from the SIM application and sending the information in a DTMF format. A Romalon gateway is a dedicated gateway to the Romalon Server.
      ii. Initiating a GPRS connection to a publicly placed Romalon entity and uploading the data to the publicly placed Romalon entity. The publicly placed entity is a Romalon entity, which may but need not follow Website or WAP portal protocol i.e. http. It may simply establish an IP connection (using TCP or UDP communication protocols) with the Romalon entity and pass the required information.
      iii. Sending SMS to a Romalon SMS gateway and then responding back with an acknowledgement SMS. The Romalon SMS gateway is an SMS messaging gateway to the Romalon Server.
4. Since the user is now active on local number, any calls made by the user are initiated from a local number and hence does not incur any additional charges pertaining to international roaming. He can access voice, data and packet services like a local mobile subscriber. He can transparently roam between 3G, 2.5G, 2G and other compatible GSM services.
5. The SIM application is configured to intercept all outgoing calls made by the user and where the user attempts to make a call outside the current country, then the call is routed through Romalon network by the SIM application. This further reduces total costs of calling by routing long-distance calls on an IP network. This feature is configurable and since the international call rates are still reasonable, the user has the option to place an international call directly from the cell-phone itself without using the low-cost Romalon VoIP network (made up of VoIP server gateways—see later).
6. The SIM application may be required to handle different features, like outgoing calls, differently on different makes and models of mobile phone, as there can be and there are differences in phone behaviour when intercepting the call. Some phones do not update their call log registry when a call is originated by a SIM application. Others show menu options differently while still others don't show anything at all. To configure such and other behaviour of SIM applications based on an equipment list, the SIM application first sends an IMEI (which is a string of numbers, that can uniquely identify a device, its make and model), along with a registration procedure. The Romalon Server checks the equipment type from a database and updates a SIM application configuration file, via a SMS or a GPRS connection, appropriately to setup a series of variable/value pairs, where the variables are used as condition handling flags within the SIM application and the values tell the SIM application to modify its behaviour for this particular handset. Thus every time the user changes its handset, the SIM application is able to behave in a different manner to make sure user gets best user feel possible with his device.

7. The SIM application may let the user choose what Caller ID (CLIP) displays on the called number, from a list of numbers, available in the CLIP file on the SIM Card. This Caller ID is passed to the Romalon Server while making an outbound call via DTMF. This Caller ID list file can be updated by the Romalon Server over the air (OTA) to reflect the user's updated settings. The Romalon Server can allow the user to add his other numbers like his home or office numbers, into this list, to facilitate user choice of numbers that he wants to be seen as at a receiver or responded to by the receiver. Thus a user can call from his mobile number and yet have a call return to his home or office number.

8. All the incoming calls on all the subscribed numbers are sent to the currently active number through Romalon's access gateway numbers. This is done by setting forwarding on all the inactive numbers of the user to forward their calls to the Romalon's access gateway numbers. Thus Romalon Server receives all the calls made to user irrespective of the number being inactive. And since the Romalon Server is aware of the user's current active location, the calls can be diverted to the active number or diverted to the voicemail box as per the user's preference. The steps can be outlined as follows, assuming the subscribed user has visited another country:
    a. A caller from the user's home country makes a call on the user's home country's mobile number.
    b. The home country's mobile number is no longer active and hence would invoke the forwarding features on the mobile operator's setting.
    c. The forwarding features would be set to forward the call to Romalon's access gateway number.
    d. The call would reach the Romalon's access gateway number and would thus enter Romalon's network.
    e. The Romalon Server knows the mobile number on which the user is currently active.
    f. The Romalon Server would route the call through the nearest VoIP gateways relative to the user's active number. And thus the user would receive call in the visited country's local number from the caller who has called him on his home country number.

9. Consolidation of all the other services such as SMS, voicemails, call detail records (CDRs), bills etc is done on the Romalon Server thus giving a completely transparent operation to the user. This is possible given the fact that all the calls are routed through the Romalon's network. Romalon's system has tie-ups with all the individual service providers, thus making it possible to consolidate bills for all different mobile numbers, user has subscribed to.

SMS Handling:

Apart from voice, SMS based messaging is one of the widely used services in mobile network. The present invention provides a system that has special handling for the subscribed user's incoming as well as outgoing SMS, in order to reduce total cost of the service to the user and, additionally, to centralize various services thus providing a common platform for access to all these services.

BRIEF DESCRIPTION OF DRAWINGS

In order that the invention may be more readily understood, reference will now be made, by way of example, to the accompanying drawings in which:

FIG. 16 shows the data structure holding MSISDN numbers in accordance with an embodiment of the present invention;

FIG. 17 shows a gateway number pool in accordance with an embodiment of the present invention;

FIG. 18 shows the steps of identifying a caller to a communications server in accordance with an embodiment of the present invention;

FIG. 19 shows a call reject procedure in accordance with an embodiment of the present invention;

FIG. 20 shows a user activation procedure in accordance with an embodiment of the present invention;

FIG. 21 shows call completion method in accordance with an embodiment of the present invention.

DETAILED DESCRIPTION OF PREFERRED EMBODIMENTS OF THE PRESENT INVENTION

The following description describes embodiments of the present invention in relation to mobile phone use. It is to be appreciated however that the present invention may be applied to any mobile telecommunications device such as a mobile phone, PDA, a computer with access to a communications network (either directly or via a SIM enabled, USB-style device) or any other device that is capable of accessing a mobile telecommunications network. In the following description like numerals are used to denote like features.

Figure 1:
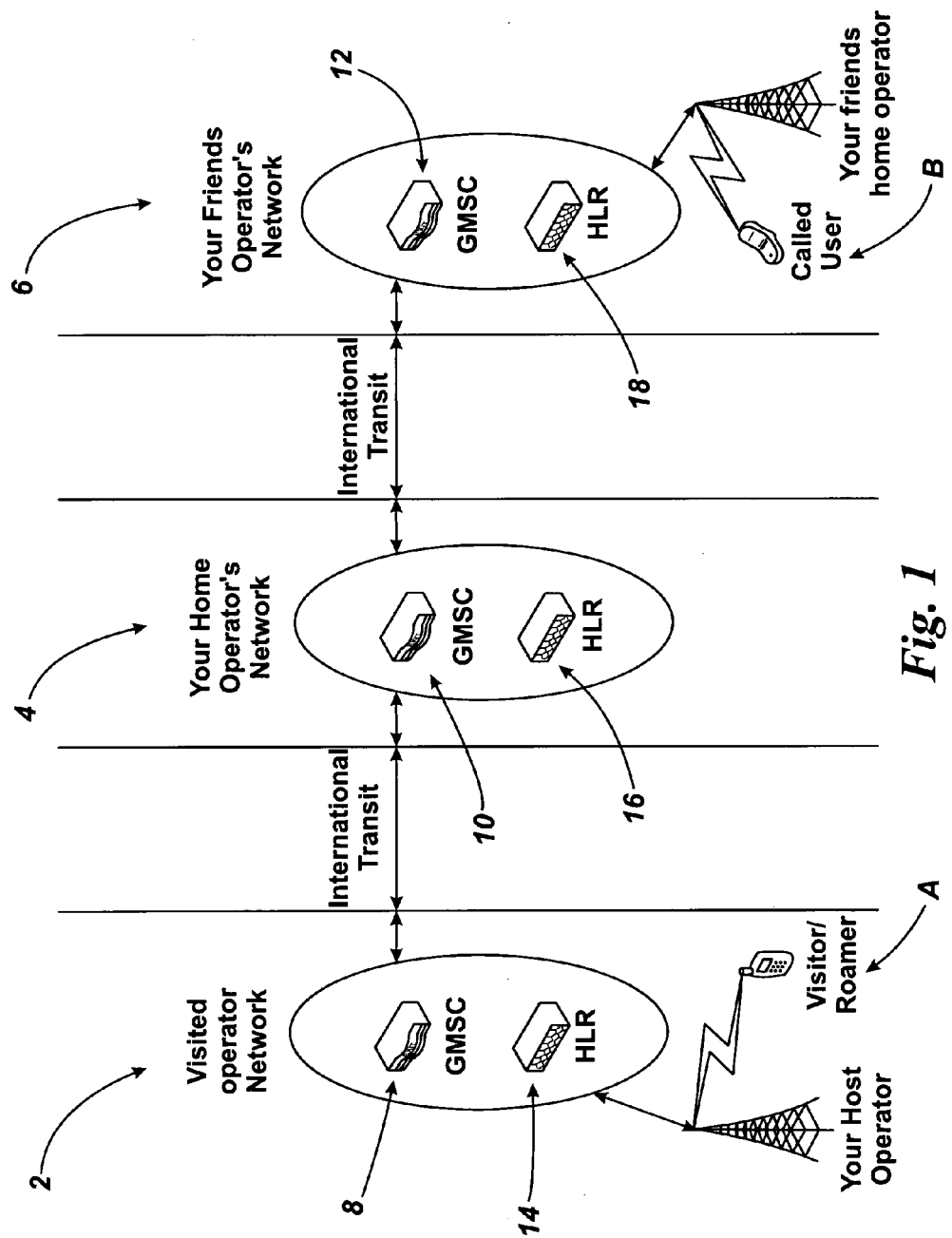
FIG. 1 shows a known international calling scenario.
Figure 2:
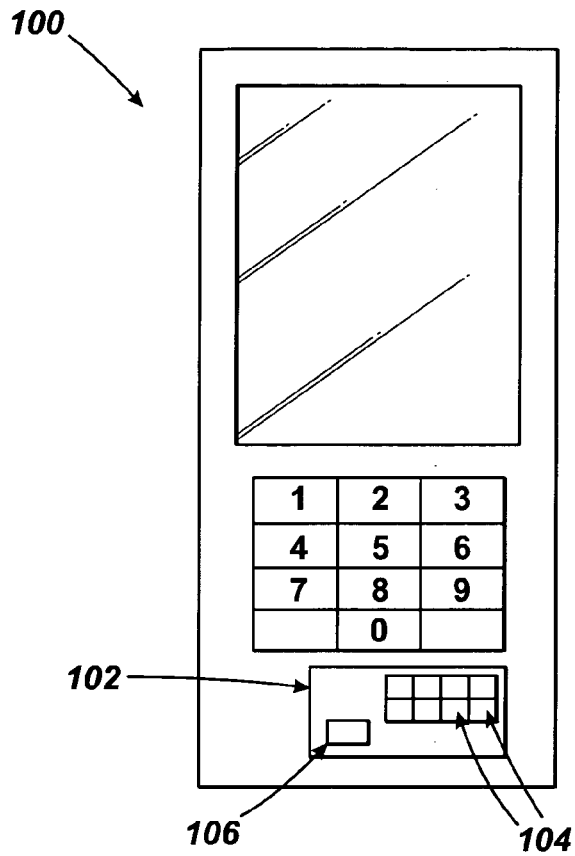
FIG. 2 shows a mobile device in accordance with an embodiment of the present invention.

FIG. 2 shows a communications device 100 in accordance with an embodiment of the present invention. In FIG. 2 a mobile communications handset 100 is provided with a SIM card 102 having multiple SIM identities 104, i.e. multiple IMSIs (International Mobile Subscriber Identity), each IMSI being associated with a different mobile directory number (MSISDN). It is noted that an IMSI is used to identify a subscriber by a mobile network operator whereas the MSISDN is the number which is used for dialing. In this figure the multi-identity SIM card is the communications device of the present invention. It is noted that the use of SIM cards is mandatory in GSM devices. The equivalent of a SIM in UMTS is called the Universal Integrated Circuit Card (UICC), which runs a USIM application, whereas the Removable User Identity Module (R-UIM) is more popular in CDMA-based devices. The UICC card is still colloquially referred to as a SIM-card and within the context of the following discussion SIM card should be taken to mean a GSM based SIM card, a UICC, RUIM or any other mobile communications based device that provides the basic functionality of a (GSM) SIM.

Within the context of the description below an IMSI and associated MSISDN are referred to as a "communications profile". It is noted however that other features such as user and network preferences may also form part of a communications profile. The term identity may therefore be taken to be generally equivalent to "communications profile".

In FIG. 2 the determination of the handset location and selection of the current IMSI may be managed by a processing component 106 located on the SIM card, a "SIM application".

The use of multiple communications profiles on the mobile communications device 100 allows the phone user to subscribe to local IMSI identities 104 in the various countries that he visits. A communications server (as described later) in cooperation with the handset allows the user to switch between the various profiles 104 on the device thereby enabling the user to reduce the level of his roaming costs.

This arrangement allows the communications service in accordance with embodiments of the present invention to dramatically reduce costs for both the callers and the recipients of roaming phone calls, by using local, in-country numbers. In other words, a user of the present invention effectively makes all his international calls as local calls. This means that:

1. No subscription to international roaming is required.
2. All the calls are charged at the rates much lower than the international roaming call rates.
3. Incoming calls are received free of cost or at a relatively lower cost than in the prior art.

On service subscription a user would typically subscribe to the countries which he normally roams in (i.e. he would set up multiple communications profiles). However, it is noted that the list of countries to which the user is subscribed can be updated even at a future time post service subscription. Thus the user may either have or be able to acquire a mobile number in all of the countries he wishes to roam within.

Figure 3:
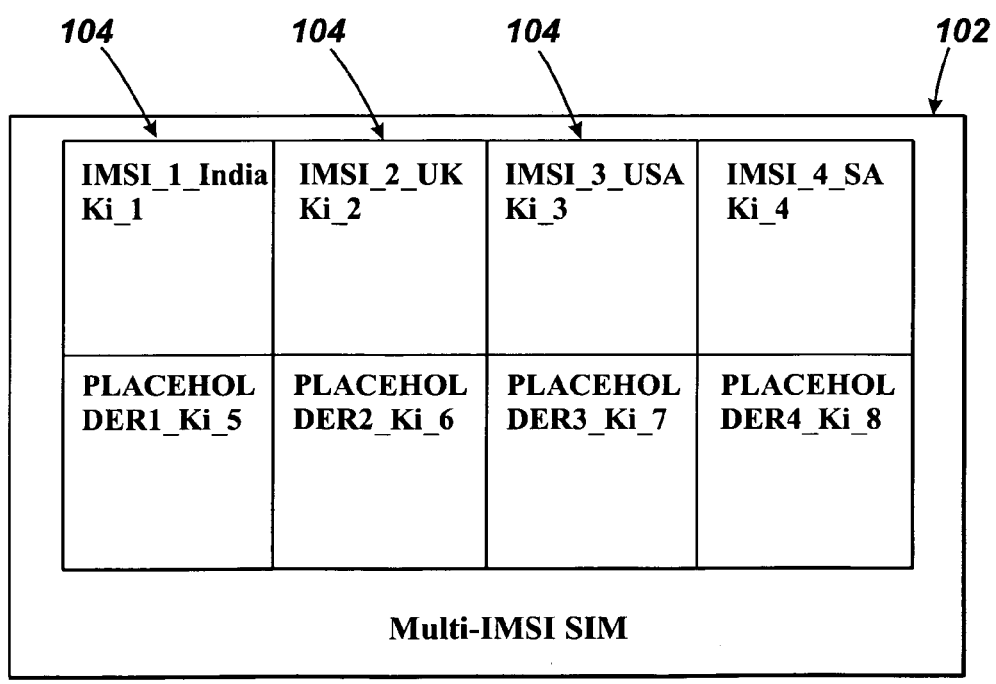
FIG. 3 shows a SIM card in accordance with an embodiment of the present invention.

FIG. 3 shows a schematic block diagram of a SIM 102 in accordance with an embodiment of the present invention, i.e. a multiple IMSI SIM. The SIM 102 shown in the Figure is pre-provisioned to hold multiple IMSIs/Kis (a Ki is a confidential key used in authentication) along with a complete GSM tree (file system) enabling mobile equipment to switch between different mobile numbers. Each IMSI preferably pertains to an individual country where the communications service in accordance with the present invention is being delivered. Preferably the SIM is pre-provisioned (as can be seen from FIG. 3 where there are communications profiles 104/IMSIs for India, UK, USA and South Africa).

Pre-provisioning the SIM ensures that over-the-air (OTA) updates of any critical authentication information such as the Ki can be reduced. The other necessary configuration relative to this new mobile number also comes into effect immediately since the whole GSM tree is substituted.

Also as can be seen from FIG. 3, the SIM has several placeholders (PLACEHOLDER1 to PLACEHOLDER4). Whilst in FIG. 3 only eight IMSIs and placeholders have been shown, in reality a SIM may have up to 99 IMSI/Ki placeholders for IMSIs and Kis.

As mentioned above, a Ki is a highly confidential key which is generated and known only to a network provider and is hard-coded inside the SIM 102 itself along with the IMSI number. Ki is made use of during authentication of the IMSI and is not sent OTA.

In order to maintain the confidentiality of the Ki, the multi-IMSI SIM may have all the Kis pre-provisioned against the respective IMSIs (IMSIs for India, UK, USA and South Africa in the example of FIG. 3), thus avoiding the necessity of OTA operations of any critical information, although this is within the scope of the present invention and could be enabled if required. Whenever a specific IMSI is to be activated/deactivated, it would be done in the operator's HLR (Home Location Register) using a mutually agreed interface to the same, between the communications server and the relevant operator.

In order to provide additional security for the IMSI/Ki pairs stored on the SIM and to reduce network operator's concerns over the integrity of their systems the SIM provides for a dual layer of encryption—essentially the entire SIM application 106 in the SIM 102 is encrypted as well as each individual Ki stored on the SIM.

One of the advantages of the communications system in accordance with embodiments of the present invention is the ability to add new service providers in new countries and it is also noted that is possible to add these new service providers in new countries to the users who have already subscribed for the services.

In order to add a new service provider, there should be a provision in the SIM 102 to add a new IMSI. Hence the SIM in accordance with embodiments of the present invention is pre-provisioned with the IMSI of the already subscribed countries, and additionally as a future provision, the SIM has multiple 'placeholders' i.e. a blank/virtual IMSIs with already generated Ki as shown in FIG. 3. Thus, whenever a new country is added and the user subscribes to this new country, then the SIM would update the IMSI OTA and replace an existing blank/virtual IMSI, without having the need to update the corresponding Ki. Thus this mechanism advantageously prevents the necessity of an OTA update of the Ki unless required.

Figure 4:
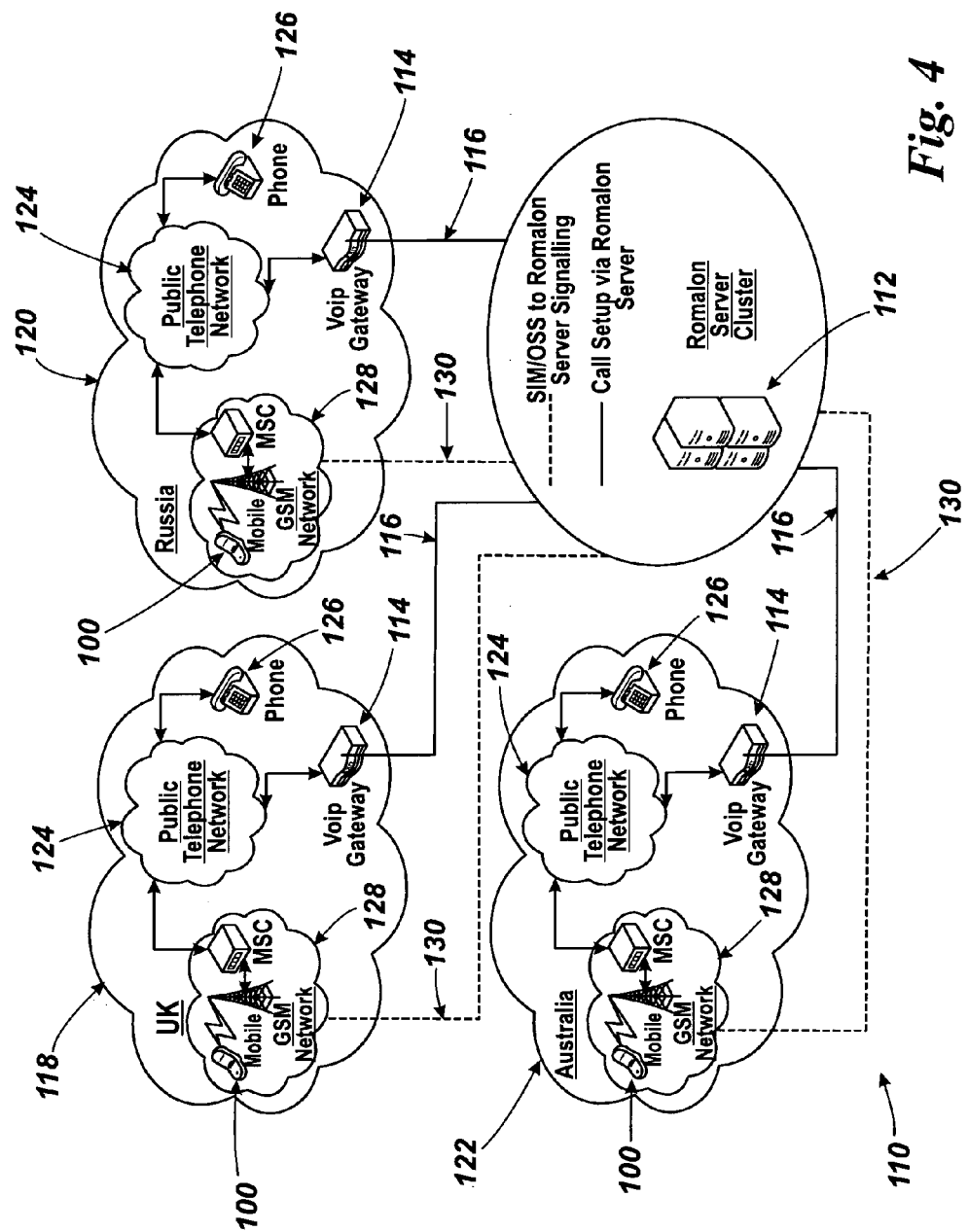
FIG. 4 shows an international calling scenario in accordance with an embodiment of the present invention.

Turning now to FIG. 4 a schematic block diagram of a communications network 110 in accordance with an embodiment of the present invention is shown. It can be seen that the network comprises three core elements: a communications server 112, a multi-IMSI SIM card (shown here within a mobile handset 100 in accordance with FIG. 2 above) and a set of network interfaces 114 (VoIP access gateways) which are described below:

a. The communications server 112 resides in a backbone VoIP network 116 and is a centralized controller that handles call delivery to and from the mobile handset based on the dynamic state of the user profile 104, including a user's currently active number and call handling options.

b. The multi-IMSI SIM card 102 resides in the user's mobile phone 100 containing one or more STK (SIM Toolkit) based SIM Applications. This special SIM and the application set control the behaviour of the mobile handset and communicate with the communications server 112 to setup the appropriate SIM identity 104 and proper routing of inbound and outbound traffic (it is noted the "traffic" in this context is any communications traffic, e.g. voice, data, SMS etc.).

c. Interfaces to allied mobile operator networks for IMSI management are used to setup and manage the different IMSIs present in the multi-IMSI SIM card and setup appropriate call forwarding options.

FIG. 4 shows three different network regions, UK 118, Russia 120 and Australia 122. For each network a VoIP gateway 114 (or VoIP access gateway) provides a connection between the public telephone network 124 of the region in question and the communications server 112 in accordance with an embodiment of the present invention.

The public telephone networks 124 are in turn connected to landline handsets 126 and also to GSM networks 128 in which a mobile switching centre routes calls from the public network via transmitter base stations to mobile users.

Calls to and from handsets 100 comprising SIMs 102 in accordance with embodiments of the present invention are denoted by the solid lines 116 to the VoIP gateways 114 from the communications server 112. Initial signalling from the handsets to the communications server (as described in more detail below) is denoted by the broken lines 130.

Figure 5:
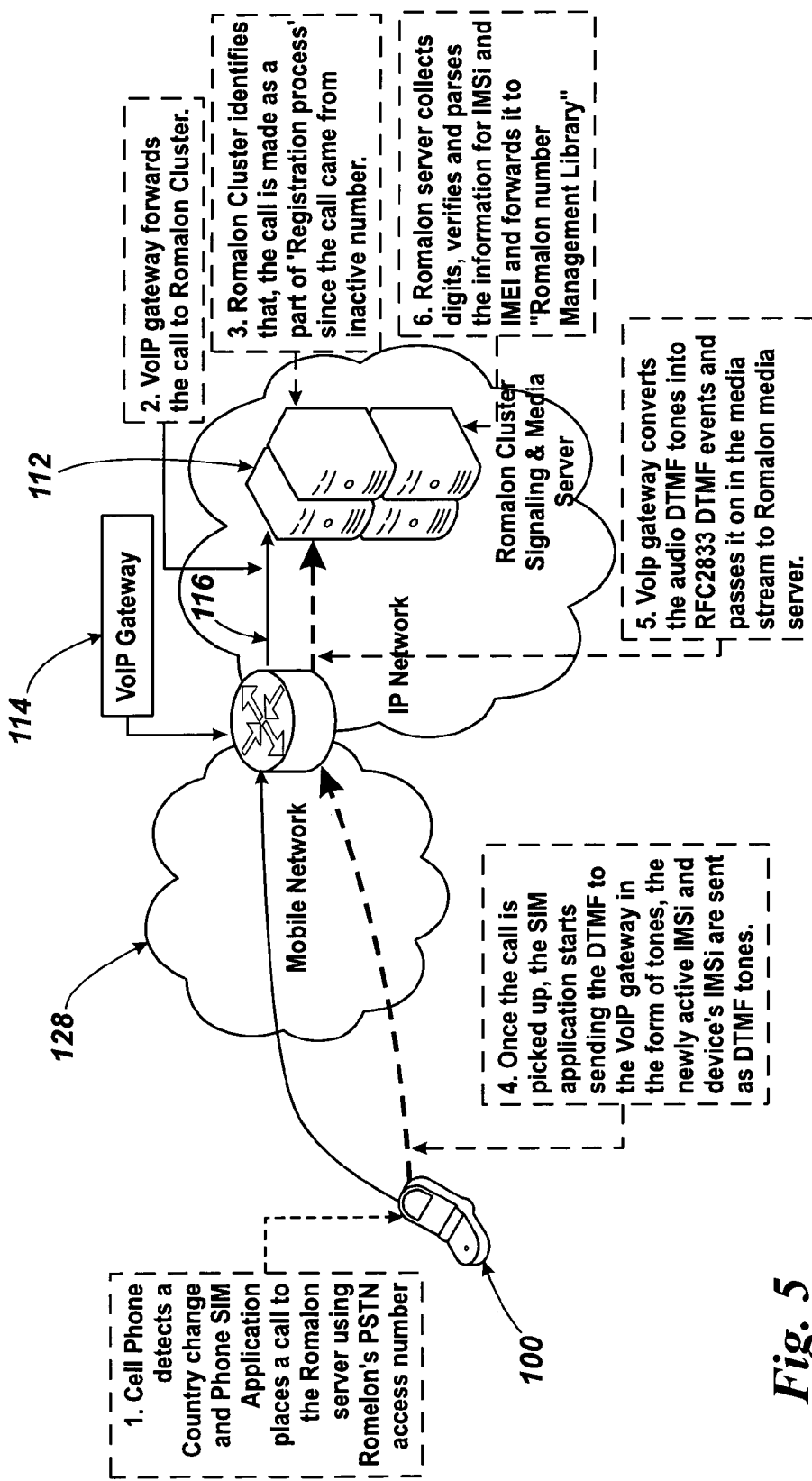
FIG. 5 shows part of the arrangement of FIG. 4 in greater detail.

As noted above the communications server resides in a backbone VoIP network. It is a centralized controller that handles call delivery to and from the mobile handset based on the dynamic state of the user profile, including user's currently active number and call handling options. FIG. 5 shows the relationship between the communications server 112, the VoIP network 116, the VoIP gateway 114, mobile network 128 and handset 100.

It is noted that the VoIP gateway 114 is a PSTN (public switched telephone network) gateway which is a device which converts calls and call signals between the communications server 112 and PSTN network 128. For example, it converts a call received on a PSTN line and sends out a corresponding INVITE (request for call) to the VoIP server. Similarly, the communications server 112 can send a request to the VoIP gateway 114 to place a call to a mobile/landline number. Thus this gateway acts 114 as a conversion device from VoIP network 116 to PSTN network 128.

The communications server 112 in accordance with embodiments of the present invention is a SIP (session initiation protocol) based VoIP signalling server which handles all the signalling with respect to calls to and from all the VoIP gateways that are part of the communications network 110 in accordance with the present invention. SIP is a widely used signaling protocol in VoIP networks and is known for high throughout, better extensibility, and for greater debugging ease. The VoIP gateway sends the signalling server with the parameters specifying the caller and the called party.

Figure 6:
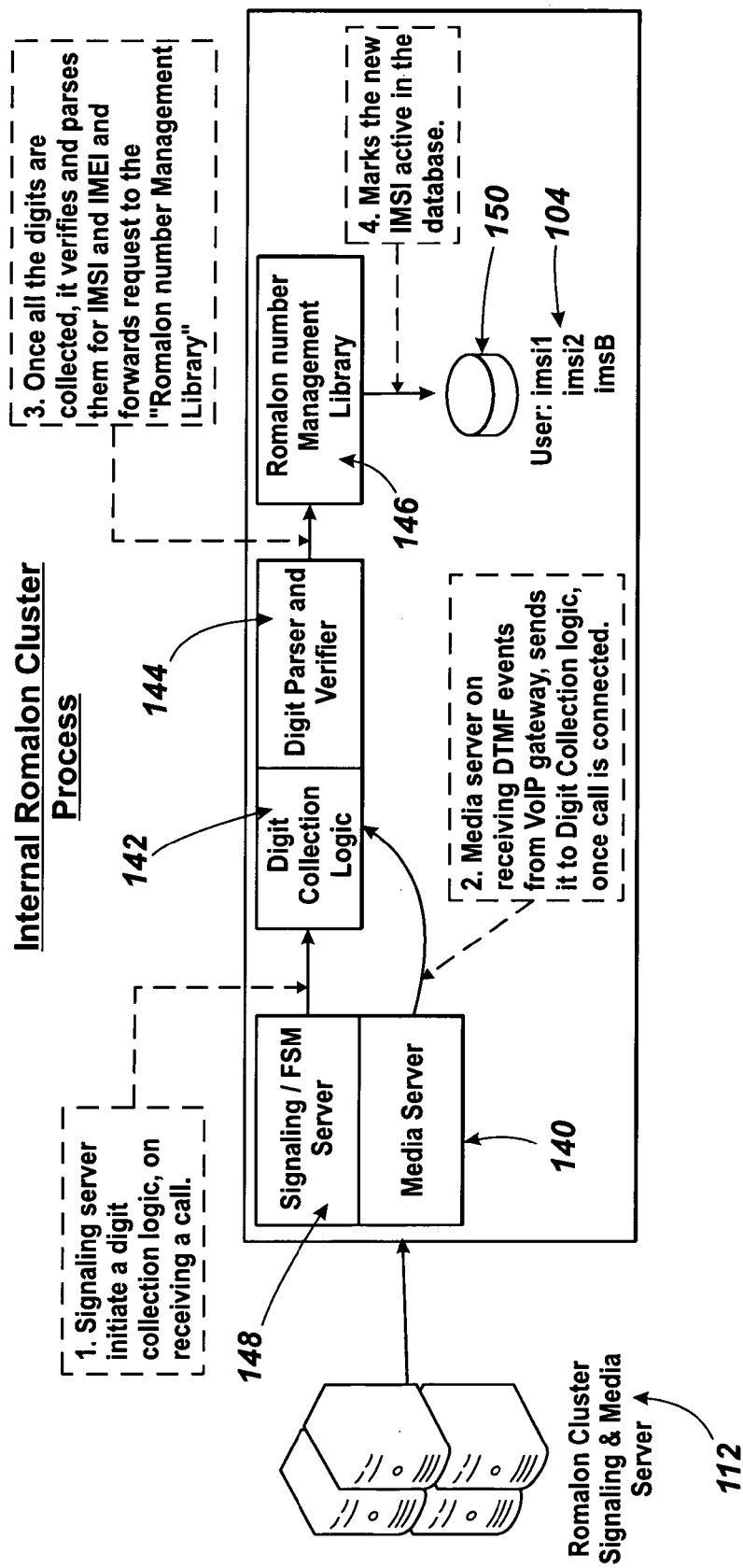
FIG. 6 shows part of the arrangement of FIGS. 4 and 5 in greater detail.

The internal structure of the communications server 112 is shown in FIG. 6 in which a media server 140 receives streaming media from the VoIP gateways 114 and is responsible to stream media back to the VoIP gateways. Apart from media the media server 140 also receives certain out-of-band events such as DTMF (Dual Tone Multi Frequency) digits. The primary job of the media server 140 is to understand different media codecs involved in a call and if necessary transcode the codecs, and also to record media files pertaining to voicemails. The media server also informs DTMF events to the signaling server.

As described in detail below, the multi IMSI SIM 102 (or more particularly the SIM application 106 on the multi IMSI SIM) may, during handset registration with the communications network and during call setup, send DTMF digits comprising various information and commands to the communications server 112.

Within the communications server 112 therefore a digit collection logic sub-system 142 is responsible for:

a. Collecting DTMF digits from the media server 140;
b. Parsing DTMF digits (within Digit parser and verifier module 144) and deriving different commands as requested by the SIM application;
c. Verifying integrity of the DTMF input (within Digit parser and verifier module 144). This is also important for security reason so that any non-system user should not be able to call-up on the VoIP access gateway and have the call go through. Also it serves the purpose of verifying that the digits received are exactly what were sent by the SIM application;
d. Using appropriate interfaces, namely the call can in turn be routed to a 'number management library' 146 or to the signaling server 148 to place a further call.

A number management sub-system 146 within the communications server provides interfaces to:

a. check if the caller is a subscribed user by checking the caller-ID;
b. mark an in-active number (inactive communications profile) as an active number (active communications profile) in database 150;
c. check the VoIP gateway number with respect to the caller-ID that is received.

Receiving Calls

Figure 7:
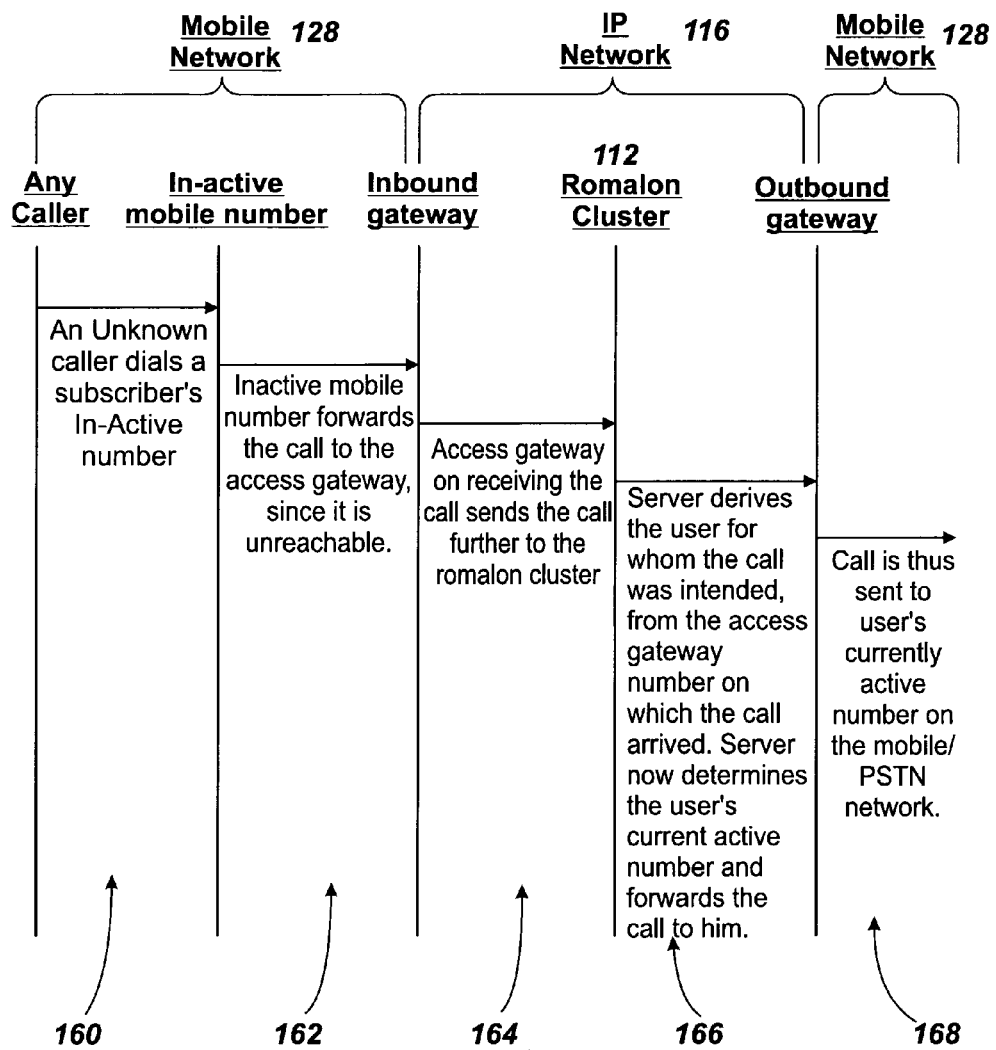
FIG. 7 shows a call reception process in accordance with an embodiment of the present invention.

The communications network 110 in accordance with embodiments of the present invention operates a "follow me" service across the various communications profiles 104 that a user may be subscribed to. This feature therefore enables a caller to reach a subscribed user on any of his communication profile numbers irrespective of his current location. This process is described below and is also shown in FIG. 7.

A user of the communications network 110 of the present invention would at any point of time be subscribed to at least two or more countries (geographic regions). Thus the user's SIM 102 would have at least two enabled IMSIs 104 and thus at least two enabled mobile numbers (MSISDN).

Since only one of the IMSIs (communication profiles 104) would at any point of time be active, the calls to the other number for that user have to be either forwarded to the active number or terminated on a unified voicemail box for the user (whether the call is forwarded or sent to voicemail would be based on the user's preferences).

This call re-direction may be done through the communications server 112, using a local gateway 114, since network operators typically block forwarding to international numbers.

A typical usage scenario might be, a service user ("the User") has a multi-IMSI SIM and numbers pertaining to three countries for example Australia, UK and US. As soon as the User arrives in the UK, his UK number (and associated communications profile) is activated and calls to his Australian and US numbers would be forwarded to his UK number through the communications network in accordance with embodiments of the present invention.

VoIP access gateways 114 inside the communications network 112 would be made use of to forward calls from the User's Australian number to his UK number and calls would be diverted to the communications server on all failure (non call-completion) conditions, thus sending the call to communications server for inactive, busy, no reply and unreachable numbers. Based on the gateway number (the number of the VoIP access gateway) handling the call, the communications server would be able to identify intended recipient.

Access gateway numbers are the numbers to which calls to an inactive communications profile are forwarded. Calls to gateway numbers are routed to the communications server.

Every time a user subscribes to a new mobile number for a particular country, a corresponding access gateway number is allocated. This allocation is done internally by the system in accordance with the present invention and is completely transparent to user, i.e. the user never participates in or realises this mapping. Also internally, a forwarding option is set within the Home Location Register for the new country network in question regarding the newly subscribed mobile number to forward all calls, when they are 'Unreachable', 'Busy' or have 'No reply', to the newly allocated access gateway number.

Now assuming the User, who has Australian, UK and US numbers on his SIM, moves to the UK, his Australian and US numbers would become unreachable. The calls to those numbers would be forwarded to corresponding local access gateway numbers which in turn would route the call to the communications server.

It is important to note that each access gateway number may be assigned to one and only one mobile number or may be used for more than one mobile number. The access gateway number, if assigned to only one mobile number, also helps the communications server identify the mobile number for which the call was originally made (i.e. it enables the mobile number corresponding to the inactive communications profile to be determined and therefore to uniquely identify the system subscriber), before it was forwarded to the communications server.

The communications server identifies the user from the destination access gateway number and knows the user's currently active number since the UK number was registered with the communications server as soon as he entered the UK. The communications server thus retains the capability to route these calls to the active UK number or let them redirect to the User's central voicemail, based on the his preference. Thus an incoming call on an inactive number would follow the followings steps (also explained in FIG. 7):

i. The Australian mobile operator receives a call to the User's Australia mobile number (Step 160). This mobile number relates to a currently inactive communications profile (since the User is in the UK). Since the User is not available locally on the mobile number, the Australian operator forwards the call (Step 162) to the access gateway number that has been uniquely allocated to the User's Australian mobile number. The access gateway then forwards the call to the communications server (164).

ii. In Step 166, the communications server determines that the call is intended for the User based on the gateway number on which the call was received. When the Australian mobile operator forwards the call, the caller field is unchanged but the called field is changed to the new destination number, i.e. the gateway number, in the example above. Since the mobile number of the incoming message/call request coming to the communications server has been replaced with the gateway number, the process to identify the called user, is to map each gateway number uniquely to a subscriber, so as to identify that subscriber (user).

iii. the communications server checks if the user wants the call to be forwarded to his currently active number or if he wants the call to be directly forwarded to voicemail (previously determined).

iv. If the call is to be forwarded to the currently active number, the communications server forwards the call to the nearest VoIP gateway with respect to the user's currently active number (Step 168).

v. Thus the user receives the call on his currently active number (Step 168).

Registration of Current Communications Profile IMSI/MSISDN (Mobile Number)

Whenever the user moves to a country where the User has a subscription, either the user can select a local number from the SIM application menu corresponding to this country as the active number [it is noted that this selection may be from all the available communications profiles or from a subset of profiles that relate to the country in question] or the SIM application may automatically select the appropriate number for this country. Once the mobile phone has registered with the network and a LOCI (Location Information) file is updated, a check would be carried out to determine if the country of the user has changed and whether activation on the communications server is required.

It is noted however that the selection of the communication profile may be automatically made by the SIM application or alternatively may involve a manual user-selection element. For example, in the event that the SIM comprises multiple communication profiles for a given geographic region the user may be presented with the option of choosing one of the available communication profiles from a list presented to him via the display screen of his mobile device. It is also noted that even in the event of there only being a single profile (for a given region) to choose from the user may be given the option of selecting that profile or opting for another profile relating to a different geographical region. The skilled reader will appreciate therefore that these various options are encompassed by the present discussion and will appreciate that various minor changes to the general process discussed herein may be required (such changes being clear to the skilled reader).

The STK application additionally has to inform the communications server regarding its new activation. The following mechanisms can be made use of to inform the communications server of the change in mobile device location:

1. The STK application places a call to the communications server through one of the access gateways and then sends the newly active MSISDN number through DTMF. The communications server, on receiving the call from STK application, collecting the DTMF which contains information regarding the newly activated number. The STK application has a mechanism to encrypt the information and has a check sum for the overall number of digits sent as DTMF. This is to ensure that the activation call cannot be spoofed and to make sure that all the DTMF digits are collected before the communications server processes them.

2. Using a GPRS connection to send the newly active number information.

3. Sending an SMS containing the newly active number to the SMS gateway in turn linked to the communications server.

For an STK application based call (case 1), the MSISDN number can be determined using the caller-ID of the call, but since the caller-ID detection depends upon gateway, it may be spoofed or it can be incorrectly detected. Hence, as a fallback mechanism DTMF is used to send the correct known MSISDN number. For E1 lines (also known as DS1 lines) for example, the STK application could dial extra digits and which could be used on reception to find information like the number to be dialed etc. Alternatively, fields such as 'telephone extension' and 'forwarded from' in the IAM/Setup request can be used. Thus if the caller-ID is detected properly, then the received DTMF is validated against the caller ID, otherwise the DTMF is used to identify the MSISDN number to activate. Optionally, sending data from the mobile phone to the communications server and back using any of the techniques explained above can be encoded.

Apart from sending the newly active number (MSISDN), the IMEI number of the device and the location information is sent to the communications server. The communications server can make use of the IMEI number to determine if the user's mobile equipment has been changed and, if it has changed, the configuration information such as GPRS access points etc, can be updated OTA (over the air) thus eliminating the need for manual reconfiguration where the user has changed mobile equipment.

Figure 8:
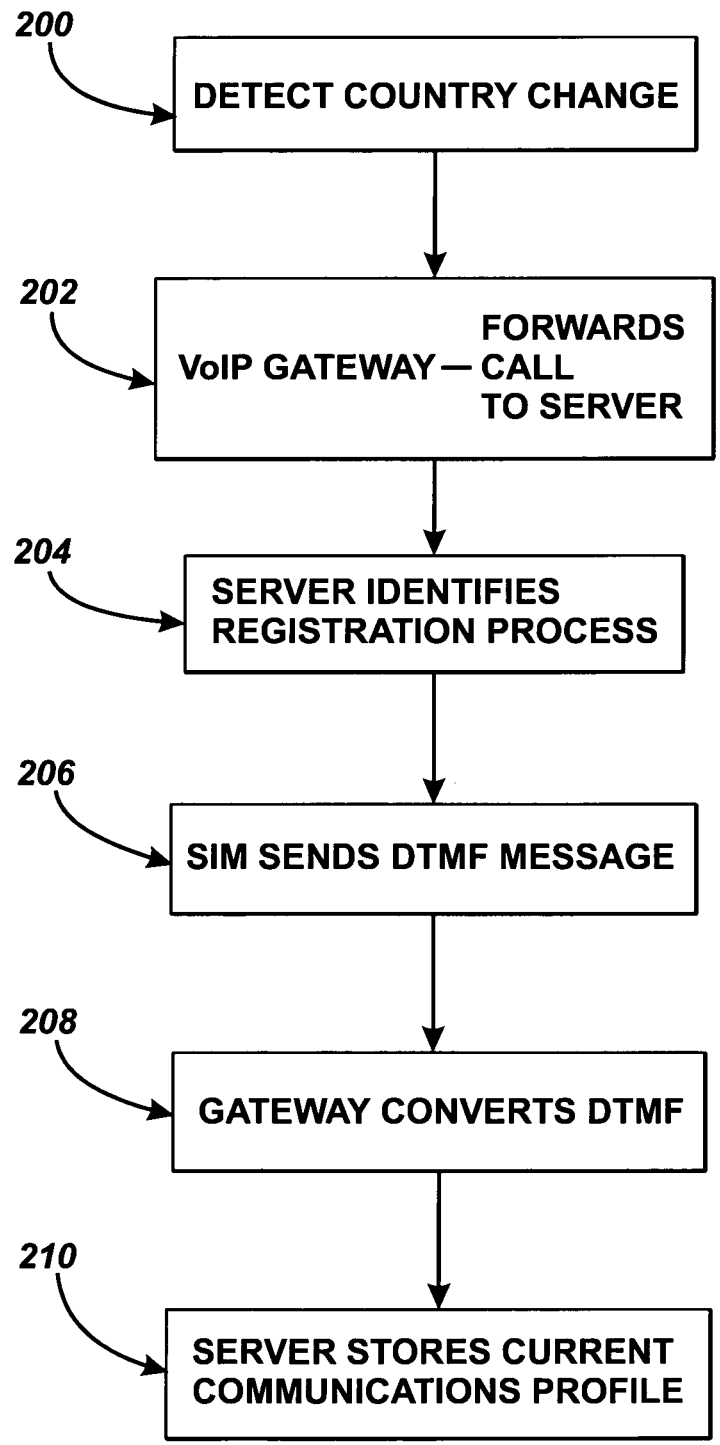
FIG. 8 shows a mobile device registration process in accordance with an embodiment of the present invention.
Figure 9:
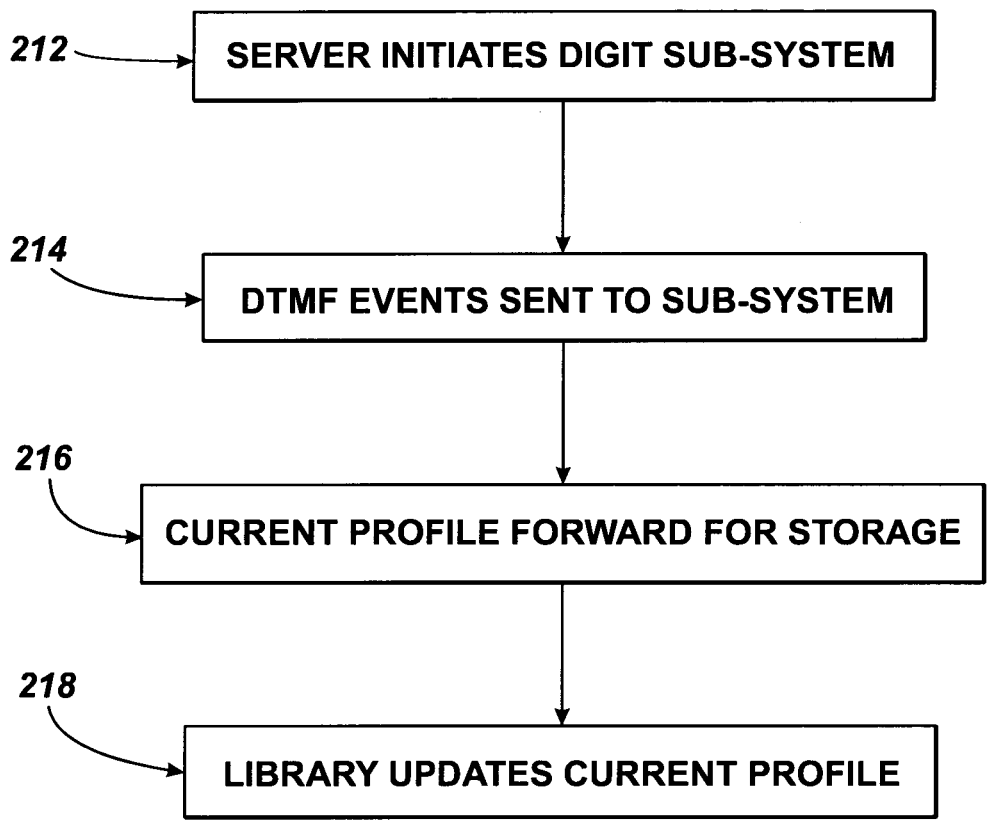
FIG. 9 shows further details of a registration process in accordance with an embodiment of the present invention.

The process followed by the mobile handset and communications server are described further in relation to FIGS. 8 and 9.

Turning to FIG. 8 the registration of the mobile device with the communications server following a country change is illustrated.

In Step 200, the mobile device 100 detects a country change (e.g. as part of the GSM handshake procedure between the mobile device and the mobile network operative in the new country). The SIM application 106 then places a call to the communications server 112 via the PSTN access number of the VoIP access gateway 114 in the country the device is located in.

In Step 202, the VoIP access gateway 114 receives the call from Step 200 and forwards it to the communications server 112.

In Step 204, the communications server 112 identifies that the call has been made as part of a registration process since it has originated from an inactive communications profile 104.

In Step 206, the mobile device 100 determines that the call it made in Step 200 has been picked up by the communication server 112. The SIM Application then begins to send a DTMF-based message to the VoIP gateway 114. The newly active MSISDN is sent as part of this message in the form of DTMF tones.

In Step 208, the VoIP gateway 114 converts the audio DTMF tones sent by the mobile device into RFC2833 DTMF events and sends these events on the media stream to the media server 140 within the communications server 112.

In Step 210, the communications server 112 collects the DTMF digits, verifies and parses the information relating to the MSISDN and stores details of the currently active communications profile 104.

FIG. 9 shows the internal registration processes that occur within the communications server 112 during the registration process.

In Step 212, the communications server 112 initiates the digit collection logic sub-system 142 on receiving a call.

In Step 214, the media server 140 sends the DTMF events received from the VoIP gateway to the sub-system.

In Step 216, once all digits have been collected and parsed and verified (by the parser 144 in FIG. 6) for the current MSISDN, the system forwards the current active communications profile 104 for storage in a Number management library 146 (shown in FIG. 6).

In Step 218, the library 146 marks the new current active communications profile in a database 150.

A unique IMEI number is associated with every mobile equipment (ME) which never changes throughout the equipment's lifetime. When a user activates one of his numbers for the first time, the STK application uses SMS to send the IMEI number as a part of the registration/activation process. Thus the communications server keeps track of the user's mobile equipment and thus retains the capability to take an action on a device change. A typical action can be to reconfigure the phone settings such as GPRS access points etc, using the OTA update mechanism.

The 'follow me' option is coupled tightly with the mobile number's ability to set forwarding to the communication server's access gateway number. Thus a way has been provided here to lock such a setting in the HLR, to prevent service disruptions due to a user's changing of such critical settings whether knowingly or unknowingly. There may optionally be a mechanism to lock the forwarding setting on the HLR for the mobile number and thus defy any user's intervention on the settings pertaining to the forwarding. The user would not be able to change or even view his diversion settings in HLR. Instead, the user would be provided with a web configuration/phone-based access to set his diversion preferences on the communications server directly. He would be able to set/unset or read his current settings for voicemail/forwarding, which could be unconditional or on failure conditions like busy, unavailable, no reply or any failure condition, by either going to a web portal, or selecting appropriate options from phone service, or dialing in an appropriate code for the service. These options are not described in detail further as their implementation will be well understood by the skilled addressee.

Outgoing Calls

Whenever a user of the communications network of the present invention attempts to place an outbound call, the SIM application intercepts the call. Where the attempted call is an international call, the call is routed to the communications server where the best communications path is selected to reduce the international call cost. The communications server has an in-built fallback mechanism to route the call on all possible routes, thus providing the user with a redundancy mechanism which is employed directly within the communications server that is completely transparent to the user (unnoticed by the user).

The SIM application has the knowledge of its current location based on the country code present in its LOCI file. Thus the application can determine if the called number is an in-country and in case it is not, it can route the call to the communications server by using one of its access gateway numbers preconfigured in the SIM as a part of the SIM STK application.

Whenever the user changes his location, the communications server can update the local access gateway number in the STK application using any of the OTA mechanisms described above. This will ensure that the STK application always uses a local number to place all its calls. Alternatively, the STK application can access a new GSM file of access numbers for each country to automatically find one.

It is also noted that the SIM application can present the user with an option to pick an appropriate caller-ID from the list of mobile numbers allocated to him. This is required so that the user can decide which of his MSISDN numbers to present to the recipient, when making an out-going call.

An additional preference that user can set, is to have communications server/application decide the caller-ID to be shown which would be decided by using the caller-ID which is local to the recipient's number. The user could even select to hide his number or use the current active number for display when making a call.

It is possible for the user to have multiple local numbers in one country and to select between them. This enables the user for example to have both a private number and a business number in the same country. When one number was in use the other would be routed to voicemail or, if the user really wanted to, they could select that calls on the business number be routed to their private number or vice-versa for a period of time.

Figure 10:
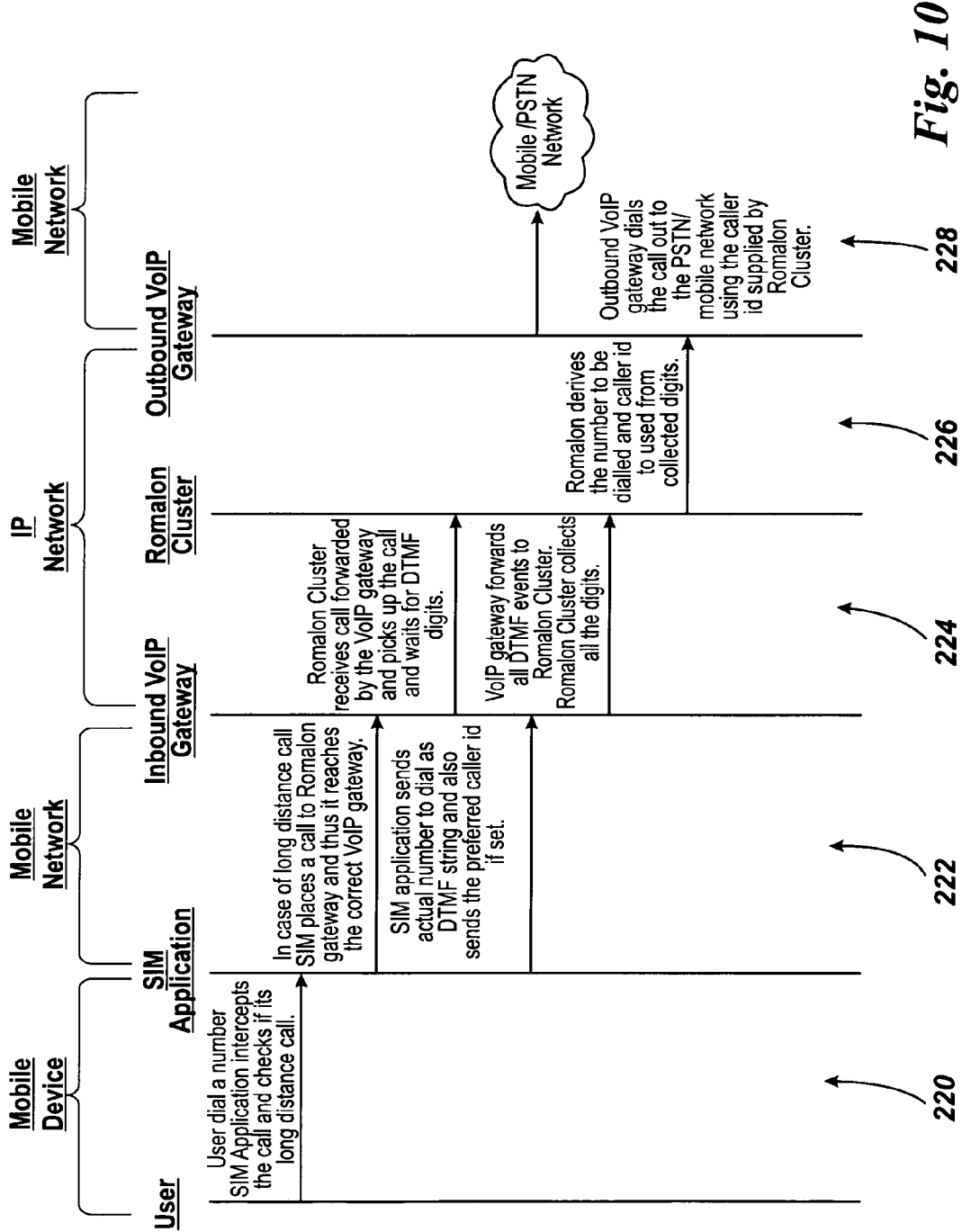
FIG. 10 shows an outgoing call process in accordance with an embodiment of the present invention.

Using the present invention there is no difference, whether two numbers belong to same operator/country or different operators/countries. When a user is not available at one of his numbers, the call is collected on his behalf by forwarding it to a gateway number, which progresses the call on to the communications server where the call is processed as per the user's preferences for that number, if present, or otherwise his global preferences. In process of doing this, the call may be routed to his current active number, or to the user's voicemail box. Also all the calls to all numbers may be forwarded to a PSTN number, in case the user happens to be in a place where the coverage is not good or non-existent. This can be done over the web interface also, unlike on a regular mobile connection where once a user is outside coverage area he cannot use the mobile's interface to change call forwarding settings FIG. 10 is a diagram showing the process steps and interfaces involved when an outbound call is made from the mobile device.

In Step 220, the user dials a number. The SIM application then intercepts the call and checks whether it relates to an in-country call or international call.

In Step 222, the SIM application has determined that the outbound call is an international call and re-directs the call to the communications server 112 via the local VoIP access gateway 114.

In parallel to Step 222, the SIM application sends the communications server the actual number that the user is trying to reach in the form of a DTMF string (again this is sent via the local VoIP access gateway). It is also noted (and described in greater detail below) that the subscribed user's preferred id can also be sent to the communications server at this point. In this manner the user can specify any of their communication profiles as the call origin point.

In Step 224, the communications server 112 receives the call that has been forwarded by the access gateway and waits for (and receives) the DTMF string that directs how the communications server should direct the forwarded call.

In Step 226, the communications server derives the number that the subscribed user is calling from the DTMF string and in Step 228 re-directs the call via an outbound VoIP gateway 114 the PSTN/mobile network.

It is noted that in Step 228 the communications server may set the caller ID to a different number than the current active communications profile 104.

Short Messaging Service (SMS) Communications

Figure 11:
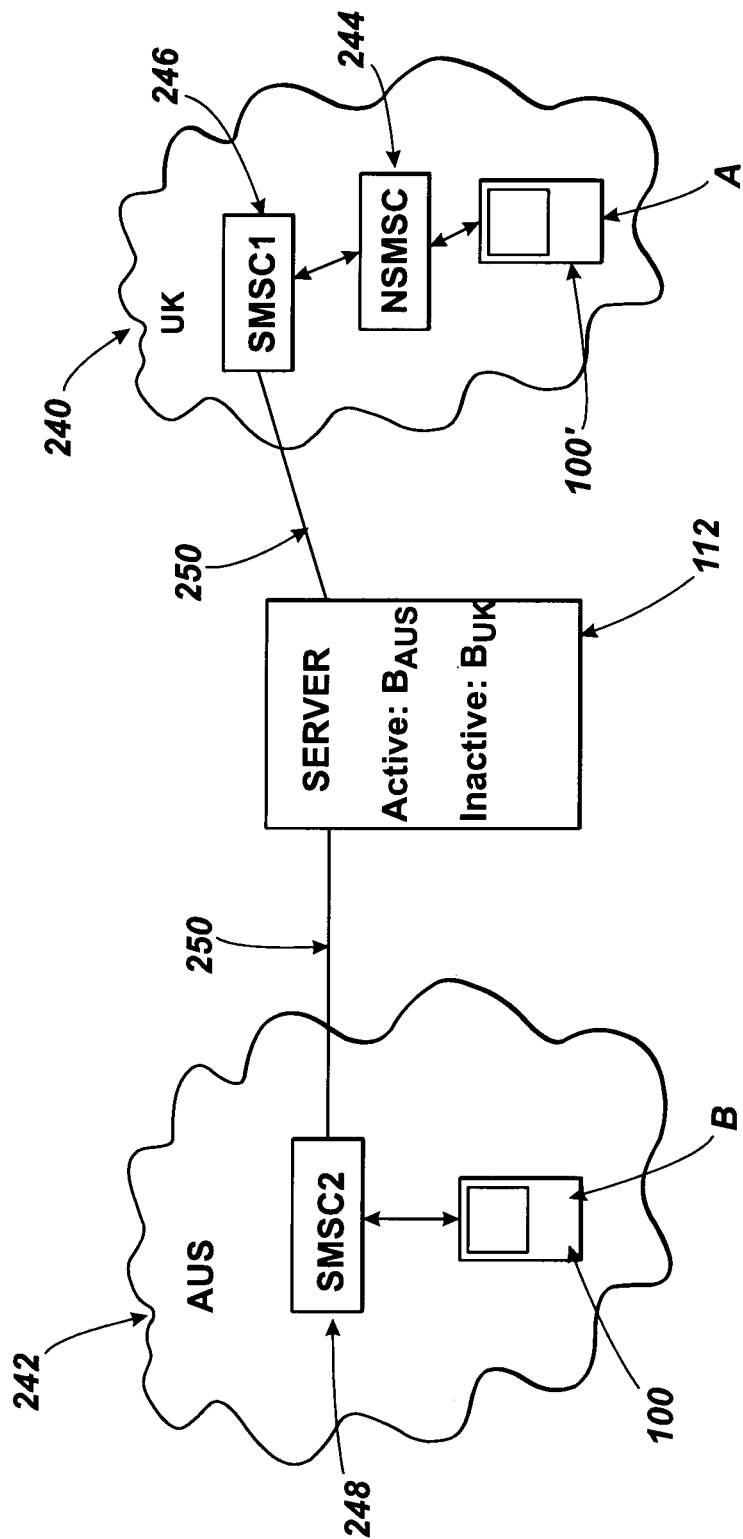
FIGS. 11, 12a and 12b show how SMS communications are handled in accordance with an embodiment of the present invention.
Figure 12A:
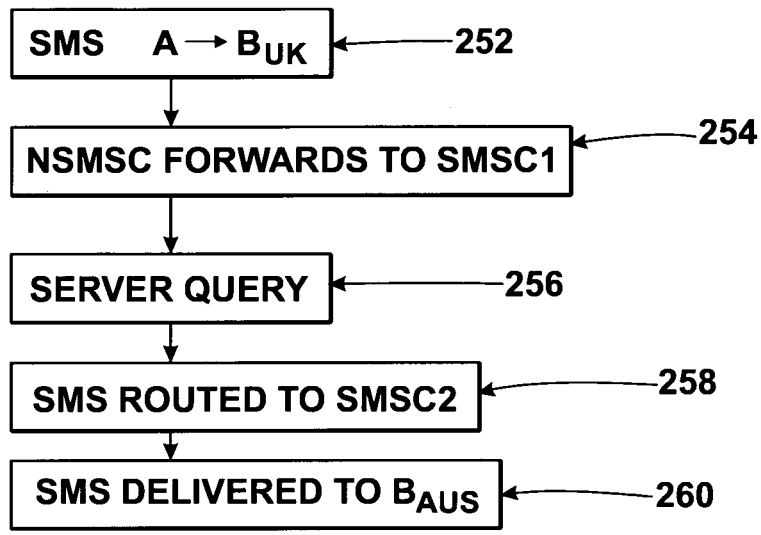
Figure 12B:
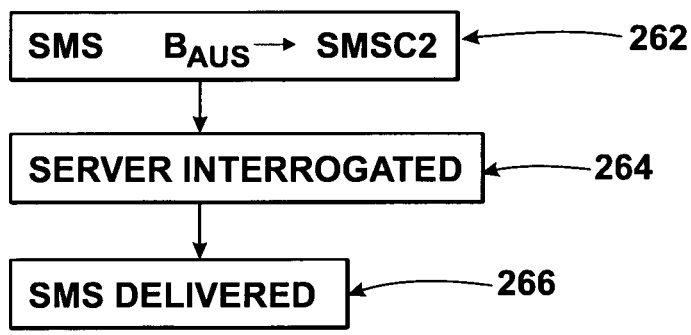

FIGS. 11, 12a and 12b show how SMS communications are handled within the context of embodiments of the present invention.

As shown in FIG. 11 two networks (240, 242) are shown, the first 240 in the UK and the second 242 in Australia. User A in the UK network is not subscribed to the service according to embodiments of the present invention. User B is a subscribed user and has a UK profile $B_{UK}$ and an Australian profile $B_{AUS}$. The communications server 112 shown in FIG. 11 is the same server as described above.

In the UK network two Short Message Service Centres (SMSC) are shown, NSMSC 244 is a centre that is associated with the home network 240 of user A. SMSC1 246 is a centre that is associated with the communications server 112.

It is noted that NSMSC 244 is configured such that SMS traffic for user B is set to be forwarded to SMSC1 246.

In the Australian network 242 an SMSC 248 (SMSC2) is present. This SMSC 248 is also associated with the communications server 112. It is noted that an SMSC in each country may not be required and a central SMSC could be employed.

It is noted that the communications server 112 stores details of the active and inactive communications profiles ($B_{UK}$ and $B_{AUS}$) of user B.

FIGS. 12a and 12b describe how messages are sent and received to/from user B.

It is noted that that for Mobile Originated SMS (MOSMS), the default behaviour is that all SMSs sent from the handset will by default use the active communications profile as the originating number and be routed via the SMSC2.

A subscribed user may, however, wish to send an SMS originating from one of his inactive communications profiles 104 (numbers), for example the subscriber is in the UK logged on with his UK number but wishes to send an SMS to a contact in Australia who has his Australian number. If the SMS is sent from the UK number then his contact will not recognise the UK originating number.

This would be handled as follows, assuming the above scenario:
1. Subscriber selects CLI (Caller Line Identification) from SIM Toolkit Menu
   a. Then selects SMS
   b. Then selects Australia from his list of MSISDNs
   c. Then selects 'Next SMS' or 'Until Changed'
2. SIM application sends invisible SMS to VSP to set SMS CLI to the Australian MSISDN
   a. VSP will use this SMS CLI either for only the next message or until changed back depending on the subscriber's choice
3. Subscriber writes SMS as normal Turning now to FIG. 12a the process of mobile terminated SMS is described. In Step 252, an SMS is sent from user A to user B's UK number ($B_{UK}$). In Step 254 the network SMSC forwards the SMS to SMSC1 (it is noted that SMSC1 has been set as the SMS forwarding gateway in the network operator's HLR).

In Step 256, the communications server 112 is interrogated by SMSC1 as to which is the active number for user B.

In Step 258, the SMS is routed accordingly. In the present example therefore the SMS is routed to SMSC2 in Australia. It is noted that this routing may preferably be achieved via use of an IP network 250 (as this will reduce the cost of receiving the SMS message for user B).

In Step 260 the SMS message is delivered to $B_{AUS}$.

FIG. 12b details the process for replying to a mobile terminated SMS. In the scenario of FIG. 12 if user B replies in the normal manner then user A will receive an SMS from $B_{AUS}$ whose number he will not recognise.

Therefore, SMSC2 will interrogate the communications server to request the SMS CLI to use. In Step 262 therefore user B sends an SMS from his Aus profile. This SMS is sent via SMSC2.

In Step 264 SMSC2 interrogates the communications server to determine the appropriate CLI to use. In this instance the communications server will see that an SMS is being sent $B_{AUS}$—A but will also know that A recently sent an SMS to $B_{UK}$ which is of course associated with $B_{AUS}$. The communications server will therefore instruct the SMSC2 to change the SMS CLI or originating number to $B_{UK}$.

In this way A receives back an SMS reply from $B_{UK}$ which he recognises (rather than $B_{AUS}$ which he doesn't). In Step 266 the SMS is therefore delivered to user A via an IP routing.

Apart from reducing the costs associated with sending international SMS messages, since now all the SMSs are forwarded to the communications server, numerous capabilities can be added upon. To list a few of them:

a. In case there is no active number or SMS message delivery to an active number fails, or otherwise, the user can have the option to receive the SMS message as an email.
b. Users have the option to archive all the SMSs based upon certain filtering rules.
c. A web-based user interface is provided to send/receive SMS messages. Also the SMS archives can be shown online to the user.

Further features of the communications device of the present invention are discussed below along with further features of the communications network. More detailed reference to some of the processes discussed above (e.g. the DTMF events) is also discussed below.

GPRS Handling

A GPRS connection can be configured on the user's ME (mobile equipment) by the user manually or as part of an update procedure, using standard device management principles. Whenever a user moves from one IMSI to another, as soon as the SIM Application registers the new IMSI with the communications server, the communications server will interact with the ME to ensure that the settings of this GPRS connection are modified to reflect the change. This update is done in either one of the following two ways:

a) An SMS of the appropriate type, from the main communications server or a server hosted in the operator network, is sent to the ME which will setup the new GPRS settings. This can be used to either add a new GPRS connection to a connection list from which the user (subscriber) can choose the appropriate connection, or to change the data in an existing connection having a generic name, say 'Romalon GPRS', to match the operator network of the active IMSI.

b) The user starts an application on the phone which will contact the communications server and download the correct GPRS settings matching the active IMSI.

The user is thus able to use Internet connectivity transparently irrespective of his current location or number.

Also this facility can be extended to change the GPRS settings on a GPRS dongle, in a similar manner.

The application of the present invention has a useful feature of being able to accommodate future application provisioning and modification of current application data in runtime. This is possible as the multi-identity SIM has been provisioned with multiple additional files of different types and capacities which are currently unused, to facilitate smooth upgrades over the air and to add new functionality, without issuing new SIM cards to existing users. This is used to overcome a limitation of most SIM cards where new files cannot be created or the sizes of existing files on the SIM card cannot be increased dynamically by a SIM application, once the SIM file system has been created at the time of issuing the SIM card. Thus there exists the ability to develop new applications at a later date which uses these unused and pre-created files. These applications can be loaded by OTA mechanisms to an existing customers SIM card and can be expected to work smoothly.

All data used by the SIM Applications, for example a Mapping List of Country Codes in IMSIs to International dialing codes for those countries, or all display message strings, etc, are kept in files on the SIM card. The SIM application loads this data into memory at the start of an application. It may sometimes be required to modify this data after the SIM card has been issued to a customer(user/subscriber). For this purpose, the SIM card in accordance with the present invention contains a special reference file that the SIM application checks at periodic intervals.

When the communications server has to update a data file, it sends out an SMS of the appropriate type that is accepted by the SIM card application to overwrite a data file with new data. Then the communications server sends another SMS of similar type that updates the special reference file with the address (or other identifier) of the newly updated data file. When the SIM application checks this special reference file the next time, it will notice that a file update indication is present in this special reference file and will accordingly load the new data from the modified data file to its memory. Thus the communications server is able advantageously to update the data used by a SIM application even after the SIM card has been issued to a user.

Unified Voicemail

A user of the communications system of the present invention typically has subscription for two or more numbers and has the capability to set call preferences across all these numbers. A single voicemail access number advantageously provides access to all of the user's voicemails and additionally has a mechanism to report which number the voicemail was left on. This mechanism becomes especially important to improve user experience, as otherwise he will have to maintain multiple independent voicemail boxes and remember the different access numbers and menu options for each.

A unified voicemail can be achieved because all the calls on the inactive numbers are forwarded to the communications server through access gateway numbers. The call to the currently active number is also routed from the communications server. The communications server is the centralized controller that handles call delivery from and to the mobile handset based on the dynamic state of the user profile, including his currently active number and call handling options. The communications server also provides a host of call features to the user including unified voicemail and call records as well as a complete web provisioning and user profile management interface. Thus, the communications server retains the capability of forwarding the calls to voicemail, unconditionally or on failure, across all the subscribed numbers for the user.

For example, a user subscribes to the service for two countries India and UK. Now when the user arrives in UK, his UK number will be active and since a forwarding is set on his Indian number to access the gateway number of the communications server, anyone calling the user on his Indian number eventually gets forwarded to the communications server where his currently active number is determined and the call is forwarded to the user on his active UK number. Since all the calls are routed through communications server, when user's mobile cannot be reached for any reason, the communications server has the capability to present unified voicemail access for all the subscribed numbers. In the situation where the 'follow me' option is not set for the Indian number, calls to the Indian number in the above scenario would be sent to the user's users voicemail box directly without trying the user on his UK number.

The STK application, using information from the communications server, can list all the voicemails the user has on all his different numbers on the phone itself without making a call to the voicemail box and perform any operation he wishes to directly from the phone without going through any IVR system. The STK application can pull the information from the communications server using any available OTA mechanism.

The communications server can push new voicemail details using SMS, or user's device can fetch such information over GPRS. The device is informed of new mail availability along with details, when device sends a periodic GPRS polling message for new information available on the communications server. The device would display the list or beep the user or show a voicemail icon as per application/user preferences. When the user checks the list, he gets an option to delete one or many of the selected voicemails. He would be able to call back the person leaving the message. He can even scroll down to a specific voicemail or number of his interest and choose to hear that message directly. Once the message starts playing, user has an option to continue with regular voicemail access or call back the current caller. At end of call, he would be able to see his voicemail list again along with a refreshed view or he may be allowed to continue with further voicemail access options. While listening, user would have an option to go to next voicemail or previous voicemail. He would be able to repeat/delete the current one and record his greetings etc.

Another way of sending information to the communications server (like changing a caller-ID) would be to make a GPRS/SMS connection to the communications server and inform the communications server of the caller-ID change along with dialed number, account to use and pass code.

Such a pass code is generated periodically by the communications server and sent to the user's device OTA. This is required to provide for additional security between the mobile device and the communications server. The communications server would send back a transaction-ID as an acknowledgement and the call would be made only on the receipt of the final status corresponding to the transaction-ID. This receipt can be sent to the communications server from the user's device in the form of a DTMF or any other mechanism described earlier. Also the transaction-ID here serves the purpose of an information integrity-check as well. If a new transaction is to be created, a previous one can be cancelled automatically by setting the appropriate field in the sent information.

Service Request/Complaint Registration

A subscriber of the communication system of the present invention might want to add/remove a country from his subscription list. The user need not have to fill in any online form for this. The STK application can also give user an option to update a new country. The call-centre executive can confirm the update after verifying the user. Also the user can file a complaint directly from the handset through the STK application. This would enable the STK application to push the current settings to the communications server to further check the issue. Apart from this, the user can dial the customer-care number where the STK application would have already verified the user and thus there won't be any other verification when the user calls the customer-care centre (note: changes to certain advanced sections might still need re-verification from the user). Additionally, when a user logs a complaint, the log file present on the SIM card, which includes a report on the last few actions, is pushed to the communications server to assist debugging. The STK application makes entries in this log file for each event it encounters or processes. In addition, this or a separate log file, contains traces of all communication between the SIM and the ME. This logging facility can be turned on from the menu (optionally with a PIN) only for specific debugging. It can also be triggered by an SMS to that ME. Such communication is a part of the SMS-based command interface with the SIM where the communications server sends SMSs and the SIM responds back after taking corresponding action or vice versa. The communications server can thus communicate with a SIM using SMS as a bearer, for various purposes like the one outlined above.

Detailed Interfaces

It is noted that the term "Romalon server" is used below and this term should be regarded as being interchangeable with "communications server".

a. Details of a DTMF-based IMSI registration mechanism are provided below (this mechanism is also described above in relation to FIGS. 5 and 6):

The subscribed user visits a country for which he has a subscribed number.

The user's mobile SIM application detects the location change and finds that it has a number which is local to the newly visited country. Thus, the SIM application invokes the IMSI registration process.

The SIM application has following information to be sent to the Romalon Server
Newly active local IMSI & MSISDN
User's mobile equipment IMEI number The SIM application places a call to the Romalon Server through one of its access gateways.

The Romalon Server picks up the call and waits for the DTMF input from the SIM application.

The SIM application sends the newly active MSISDN as a DTMF input to the VoIP gateway. The Romalon Server specifies the DTMF string format in which it expects the DTMF events.

The VoIP gateway converts the DTMF tones into RFC2833 DTMF format and sends it further to the Romalon media server.

The Romalon media server sends the DTMF events to the digit collection logic in Romalon's signaling server.

All the DTMF digits are collected and are parsed and verified for integrity.

After parsing, the MSISDN number is derived from the collected digits and are passed to Romalon's number management library. Romalon's number management library is responsible for various add/delete/update/mark active kinds of operations on the user's subscribed numbers.

Figures 13, 14:
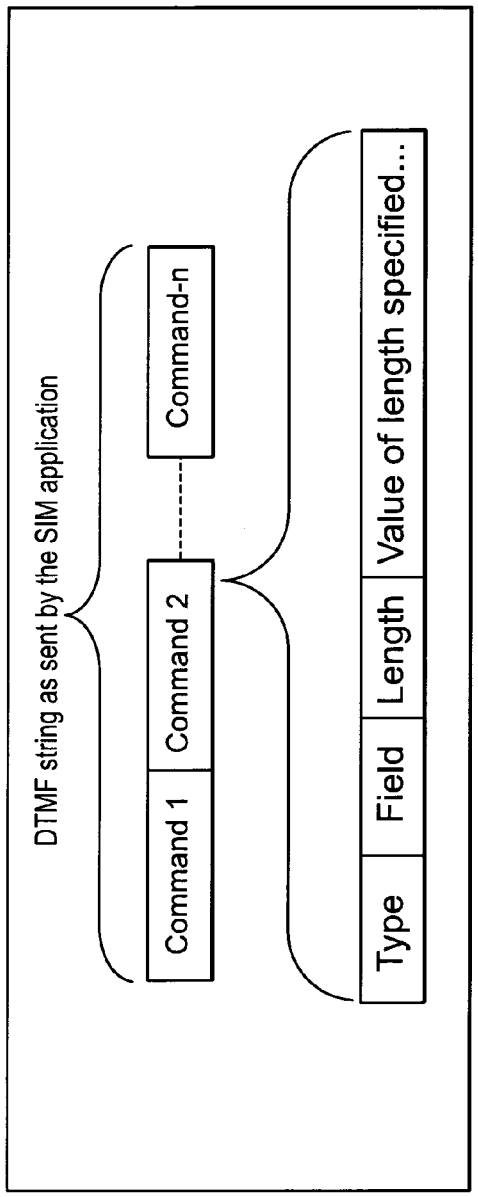
FIG. 13 shows a DTMF encoding mechanism in accordance with an embodiment of the present invention.
FIG. 14 shows a user list in accordance with an embodiment of the present invention.

DTMF Encoding Mechanism:

The encoding system is designed to support future additions to the commands and fields. The SIM application can send one command at a time in a single transaction (the transaction can be performed using a Call/SMS/GPRS connection etc). A command identifies the kind of service the transaction wants to avail. A command contains a series of fields which are used as different attributes to the service to be invoked. The field contains a unit of information which the SIM wants the Romalon Server to use, for example, when it attempts a call or during the registration process. Various fields that are supported currently are: Use Caller-ID, Remote MSISDN to which the call is to be dialed. The overall structure can be depicted as shown in FIG. 13.

Within this Figure the possible values of the different fields are set out below:

Possible values of Type:
01—Mobile originated call.
02—Mobile originated SMS.
03—Mobile originated requests for Romalon Server.

Figure 15:
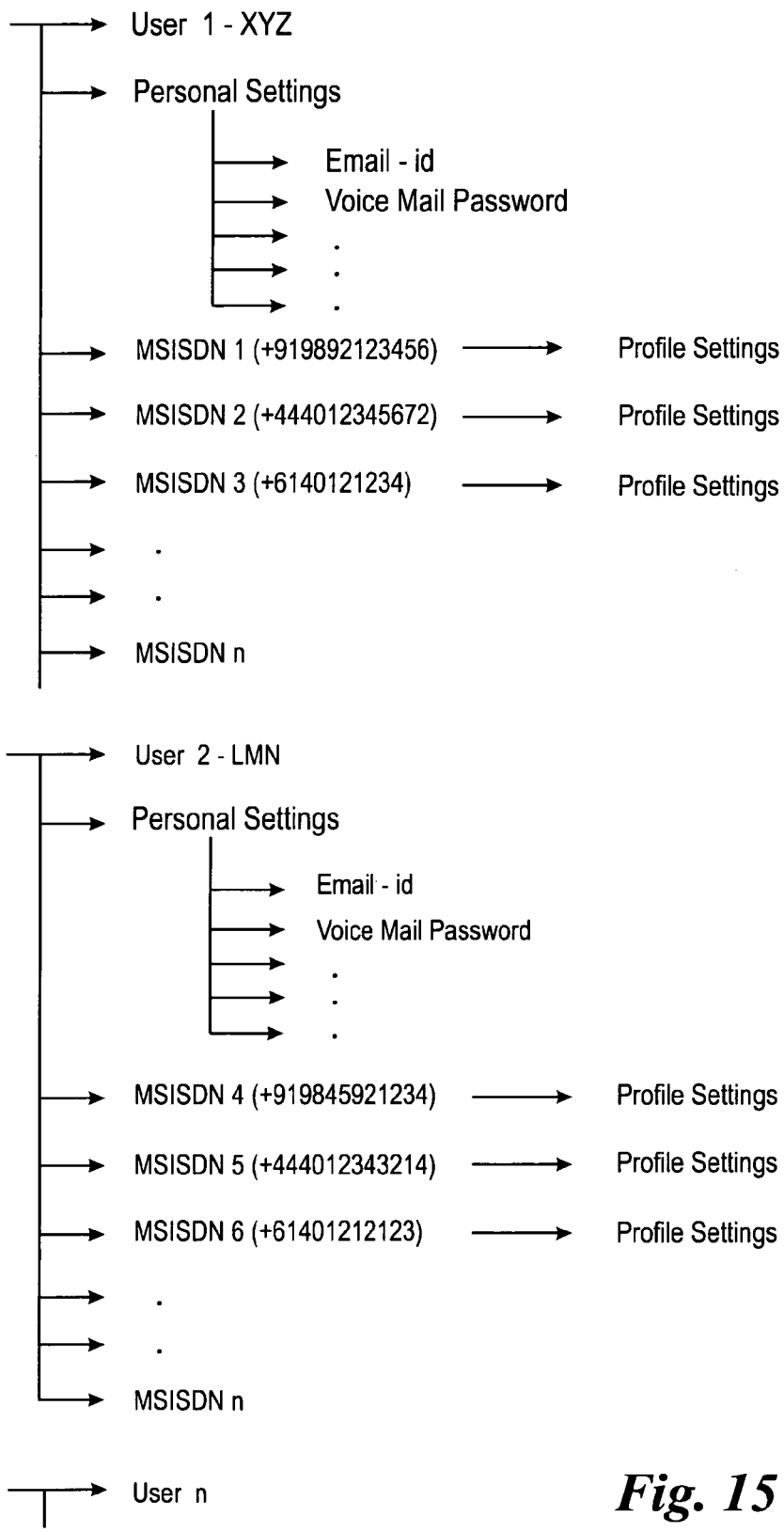
FIG. 15 shows a representation of users in the user list of FIG. 14.

Possible values of Field:
  01—Caller-ID (CLIP)
  02—Dialled number (Remote MSISDN number)
Length: Length of the data which is to be followed.
Value: Value of the field.
For example:
  A user is in the UK and attempts to place an outgoing call to India on number 00919870012345 and he wishes to show the called person, his Indian-subscribed number caller-ID which is 00919870076543. The encoding would result in the following string: 38010214009198700123450114009198700 76543, where first 2 digits i.e. 38 is length of total DTMF input, not counting the length itself. Next 2 digits i.e. 01 request a mobile originated call. 02 after that specifies that remote number follows. 14 is length of this field with value 00919870012345. 01 after that specifies Caller ID with length 14 and value 00919870076543.
  b. Number and User Management Data structures and interfaces:
FIG. 14 shows a User List which has several fields describing the users, their names and the relevant field structures. This list contains all the users subscribed to the Romalon service. Every user entry contains its own preferences with respect to the different services offered. A typical representation of all the details for the users in the User List is shown in FIG. 15 where:
  1. The user typically subscribes to more than one MSISDN number with respect to different countries.
  2. A profile is associated with every MSISDN number the user subscribes to and is stored in context to that user. The profile contains the user's preferences with respect to the mobile number associated with the MSISDN number. Thus a user can have all calls diverted to voicemail box if a call is directed to one of its currently inactive subscribed numbers and at the same time have calls coming on all other inactive numbers to be rerouted to his currently active number.
  3. The active MSISDN number is the currently active mobile number of the user which has been set active either by the Romalon SIM in user's mobile equipment on determining user's current location or if the user manually overrides his location by using an online-form.
  4. User's email-ID is required for features such as sending voicemails as emails, missed call alerts on email etc.
Operations Supported:
  1. Add/Remove a MSISDN profile from the list of array of MSISDN profiles with respect to user.
  2. Mark an MSISDN number present in the user as active. This is done when the user's SIM during registration process marks the user's number active.
  3. Enable/Disable the user. Disabling the user would mean user wont be able to use any of Romalon's services.
The MSISDN_NumberPool (or the data structure holding the MSISDN numbers) is shown in FIG. 16.
  1. The MSISDN number itself helps in identifying the country to which this number belongs since the number is stored in complete format for e.g. a U.K. number will be stored as +441234567890.
Operations Supported on the List:
  1. ADD: Adds an MSISDN number to the list.
  2. UPDATE gateway index: Links an access gateway number with the MSISDN number. Thus calls coming up on the gateway number can be mapped to the corresponding MSISDN number.
  3. GET:
    a. GETs an MSISDN number for a particular country. This operation is invoked when the user requests subscription to a particular country.
    b. GETs an MSISDN number whose gateway number is 'gateway_nnn': This operation is invoked when a Romalon Server receives a call on one of the gateway numbers and it has to derive the corresponding MSISDN number.
Gateway_NumberPool:
  Whenever a user subscribes to the service in the new country, the user is allocated a mobile number for that country. Along with the mobile number, a gateway number is mapped for that mobile number. Forwarding is set in the mobile number to forward calls to this gateway number when the user is not reachable. FIG. 17 shows a typical Gateway_Number pool.
  Details of the outbound call's interfaces are provided in FIG. 10. FIG. 7, however shows the interfaces for an inbound call to a subscribed user's inactive mobile number from an any caller.
  The method by which the Romalon Server communicates with the SIM using a voice call and DTMF is now described. More specifically, procedures for the operations of identifying the caller, for rejecting the call, for activating a user and for completing the call are now described with reference to FIGS. 18 to 22 respectively.
  FIG. 18 shows the steps taken in identifying the caller at the Romalon Server. The steps taken will be clear to the skilled addressee and require no further explanation herein. However, some terminology used is set out below:
Terminology:
  i. Mapped Number: The gateway number to which forwarding on failure is set in the HLR.
  ii. Unmapped Number: The gateway number which is used for collecting DTMF digits to place International Calls.
  iii. Known: Romalon Subscribers.
  iv. Unknown: All the other numbers except mapped numbers and gateway numbers, that can be called, either directly using VoIP phone or after digit collection, where user has the option to enter the dialed number.
  v. Service Number: Predefined numbers configured on the Romalon Server to access certain add on services such as a short code service, conference room, voicemail access etc.
  vi. A and B here are any caller and callee when the call hits the Romalon Server.
  vii. C and D are the required caller and callee which are obtained after applying the Romalon call setup algorithm.
  viii. STK encoded: Numbers as expected from the STK application, encoded and decoded with a proprietary algorithm that uniquely and securely identifies caller (Referred to as C) and can have called number (D), caller ID and various other caller preferences. On successful verification, C would be the person calling and D would be the called number.
  ix. Active: User's mobile number, which is currently being used by user, on which he would receive calls and from which he would be originating calls.
  x. In active number: The number which belong to user, but is not being used by user currently either intentionally, or because he is roaming. Calls to such numbers would be forwarded to a gateway number (GW), by the HLR that owns this number. Romalon Server can take such calls to Active number, user's voicemail box etc.

xi. FM: Follow me service, which lets user choose, whether he wants to receive calls coming to that number, when the number is inactive.

It is to be appreciated that:

a. Every Romalon mobile user will be given a pass code for security purpose. When STK application, tries to call out, it will have to provide the security pass code to uniquely verify the user, along with user's mobile number.

b. If A is a known number and digits sent by STK application try to identify him as C where C!=A, the call would be rejected, even after a successful pass code verification, as a security mechanism.

c. The user can access his voicemails by dialing in any of his own numbers.

d. If user is not active, all calls placed by user, would activate the user and that call would be terminated after announcement.

FIG. 19 shows the Call Reject procedure and FIG. 20 shows the User Activation Procedure which are used as results from certain procedures in FIG. 18. Similarly, FIG. 21 shows the final step of the call completion method and follows on from the flow chart of the procedures shown in FIG. 18.

In order to implement the present invention as described in the above embodiment, several changes are required to the existing communication infrastructure and these are described below:

a. In the Operator's Network

The only change required in the Operator's network is to prevent call diversion settings to be set by user as before. All these settings are available on Romalon web interface to users as well as administrators and would be handled by Romalon Server. This is not essential for implementation of the present invention but having it reduces chances of users changing it knowingly or unknowingly.

Also user's SMS would now have to be diverted to a Romalon defined number, which would collect and forward user's SMSs on their active numbers or initiate procedures to complete user's preferences like SMS to email, archival etc.

b. In Handsets

Handset call diversion settings would now be set to divert to the Romalon Server instead of the Operator's network elements. Handsets now will have multiple IMSIs and will have a choice of which one to start with. The STK application on the handset SIM would require support from the handset for call control, understating location requests, refreshing commands and sending DTMF messages. Also the handset has to work with common device managers for automatic settings updates like for GPRS.

c. In other networks/network elements, no other change in behavior of any of existing communication infrastructure is required.

Advantages of the Present Invention

The present invention offers several advantages over existing solutions or problems that have been highlighted above:

1. User can use all features offered by local operator, even while he is not in his home country;
2. Reduction in operational costs, for consumers and service provider;
3. Regulatory framework as on local subscribers;
4. Ease of configuration with high flexibility;
5. Transparent working automatically in the background if required or possibly with minimal user intervention for virtual identity switch (Change of IMSI along with associated preferences).
6. Comparable Follow Me solution for SMS messages Alternatives The idea is to provide roaming users with a local identity and then knowing a user's location at any time, to be able to take his calls from countries where he owns an identity to his current location. In doing so, user's preferences can be applied to call handling.

The present invention has been described in general in GSM context, but the present invention applies uniformly to any 2.5/3G network, any CDMA network or in general to any telecommunications network which in any of these cases has a full or partial roaming capabilities and uses a SIM card as the user identity.

It is not necessary/implied that a VoIP backbone has to be used in a telecommunications network in accordance with embodiments of the present invention. This can be done with a simple backend server which keeps track of user's current location and identity and then redirects calls on user's other identities to his current one.

It is noted that the above invention may be integrated into a range of telecommunications devices such as GSM-based and also CDMA, W-CDMA, CDMA 2000, 3G and other similar or compatible technologies existing now or in the future and dual/multi mode versions of devices supporting 2 or more of these protocols.

Although the above description refers to pre-provisioned IMSI identities it is noted that subscribers' numbers might not be permanently assigned but could be short term or temporary. As a further alternative, the present invention supports a rental type scenario where a user takes an additional number for only a short period of time. It is noted that both of these scenarios may be managed remotely OTA.

Embodiments of the present invention may also include the scenario where voice traffic is routed to and from a subscriber's mobile phone using a data network when the subscriber is logged on to a WiFi or 3G network.

The above described embodiments of the invention conveniently can be integrated alongside existing mobile network operators. In the event where there is no available mobile network partner, a block of landline/IP numbers may be acquired for use by subscribed users which then divert to the active mobile number.

It will be understood that the embodiments described above are given by way of example only and are not intended to limit the invention, the scope of which is defined in the appended claims. It will also be understood that the embodiments described may be used individually or in combination.

The invention claimed is:

1. A communications server for routing communications traffic between a first communications apparatus and a second communications apparatus, the second communications apparatus comprising a first mobile subscriber identity and a second mobile subscriber identity, the first mobile subscriber identity being associated with a first network operator in a first geographic region and the second mobile subscriber identity being associated with a second network operator in a second geographic region, the server comprising:

input module arranged to receive a communications signal from the second communications apparatus informing the server which mobile subscriber identity is active on the second communications apparatus;

input module arranged to receive communications traffic from the first communications apparatus directed to an inactive mobile subscriber identity of the second communications apparatus;

processor arranged to determine the active mobile subscriber identity of the second communications apparatus based on the communications signal received from the second communications apparatus;

output module arranged to route the communications traffic intended for the inactive mobile subscriber identity of the second communications apparatus to the active mobile subscriber identity of the second communications apparatus.

2. A communications server as claimed in claim 1, wherein the processor is arranged to determine the location of the second communications apparatus by determining the active mobile subscriber identity of the communications apparatus.

3. A communication server as claimed in claim 1, wherein each mobile subscriber identity has a unique identification number (MSISDN).

4. A communications server as claimed in claim 1, wherein each mobile subscriber identity of the second communications apparatus is associated with a unique access gateway number.

5. A communications server as claimed in claim 1, further comprising a data store, the data store comprising data relating to each mobile subscriber identity associated with the second communications apparatus wherein the currently active mobile subscriber identity of the second communications apparatus is updated upon receipt of the communications signal.

6. A communications server as claimed in claim 1, wherein the processor is arranged to determine the location of the second communications apparatus from the number dialed by the first communications apparatus.

7. A communications server as claimed in claim 1, wherein the routing destination is a voicemail account and the output module is arranged to route the communications traffic to the voicemail account.

8. A communications server as claimed in claim 1, wherein the first communications device is located in a first geographic region and the second communications device is located in a second geographic region.

9. A communications server as claimed in claim 1, wherein the communications traffic comprises one or more of the following types: voice calls, SMS communications, MMS communications, data traffic.

10. A communications system comprising a communications server according to claim 1; at least two access gateways wherein each gateway is arranged to be in communication with the communications server.

11. A communications system as claimed in claim 10, wherein each access gateway is located within a different geographic region.

12. A communications system as claimed in claim 11, wherein each access gateway is arranged to be in communication with one or more telecommunications networks located within the same geographic region as the access gateway.

13. A method of operating a communications server for routing communications traffic between a first communications apparatus and a second communications apparatus, the second communications apparatus comprising a first mobile subscriber identity and a second mobile subscriber identity, the first mobile subscriber identity being associated with a first network operator in a first geographic region and the second mobile subscriber identity being associated with a second network operator in a second geographic region, wherein one of the mobile subscriber identities is active and one of the mobile subscriber identities is inactive, the method comprising:

receiving a communications signal from the second communications apparatus informing the server which mobile subscriber identity is active on the second communications apparatus;

receiving communications traffic from the first communications apparatus directed towards the inactive mobile subscriber identity of the second communications apparatus;

determining a routing destination for the communications traffic based on the communications signal;

routing the communications traffic to the routing destination;

wherein determining the routing destination comprises determining the active mobile subscriber identity of the second communications apparatus; and routing the communications traffic comprises routing the communications traffic to the active mobile subscriber identity of the second communications apparatus.

14. The method of 13 wherein a program encoded within a computer readable medium is provided to processors of a computer to control the communication server.

* * * * *